(12) United States Patent
Gordin et al.

(10) Patent No.: US 8,928,662 B2
(45) Date of Patent: Jan. 6, 2015

(54) APPARATUS, METHOD, AND SYSTEM FOR DEMONSTRATING A LIGHTING SOLUTION BY IMAGE RENDERING

(75) Inventors: Myron Gordin, Oskaloosa, IA (US); Lance K. Livingston, Arvada, CO (US); Kevin J. Marshall, Golden, CO (US)

(73) Assignee: Musco Corporation, Oskaloosa, IA (US)

( * ) Notice: Subject to any disclaimer, the term of this patent is extended or adjusted under 35 U.S.C. 154(b) by 191 days.

(21) Appl. No.: 13/221,305

(22) Filed: Aug. 30, 2011

(65) Prior Publication Data
US 2012/0050254 A1    Mar. 1, 2012

Related U.S. Application Data

(60) Provisional application No. 61/402,600, filed on Sep. 1, 2010.

(51) Int. Cl.
*G06T 15/50* (2011.01)

(52) U.S. Cl.
CPC ............ *G06T 15/50* (2013.01); *G06T 2215/16* (2013.01)
USPC ........................................................ 345/426

(58) Field of Classification Search
CPC ... H04N 5/2256; H04N 9/315; H04N 1/2125; H04N 1/60; H04N 1/00835; G06T 15/506; G06T 2215/16; G06T 7/408; G06T 15/50; G06T 2207/10024; G06T 19/00; G06K 9/4661; G06K 7/10732; G06F 17/5009; G06F 17/50; G06F 17/5004; G06F 3/048; G06F 17/5072; G01J 5/0896; G09G 2320/0646; G09G 2360/144; G09G 3/3406; G09G 2320/0626; G09G 2320/0633; B60K 2350/203

USPC ........................................................ 345/426
See application file for complete search history.

(56) References Cited

U.S. PATENT DOCUMENTS

| | | | |
|---|---|---|---|
| 5,027,307 | A | 6/1991 | Kusmer |
| 5,521,852 | A | 5/1996 | Hibbs et al. |

(Continued)

FOREIGN PATENT DOCUMENTS

| | | |
|---|---|---|
| WO | WO 2008/001259 A2 | 1/2008 |
| WO | WO 2009/066234 A2 | 5/2009 |
| WO | WO 2012/030813 A | 3/2012 |

OTHER PUBLICATIONS

Larson, Gregory Ward et al., "A Visibility Matching Tone Reproduction Operator for High Dynamic Range Scenes", IEEE Transactions on Visualization and Computer Graphics, vol. 3, No. 4, Oct.-Dec. 1997, pp. 291-306.

(Continued)

*Primary Examiner* — Kee M Tung
*Assistant Examiner* — Haixia Du
(74) *Attorney, Agent, or Firm* — McKee, Voorhees & Sease

(57) ABSTRACT

A user interface is provided whereby a user may generate a virtual target area representative of an actual target area, regardless of whether the actual target area has been constructed. Having a generated virtual target area, the user—via the user interface—may generate virtual representations of light to project onto the virtual target area. The virtual representations of light correspond to photometric data from actual light sources. In this manner, the user renders a real-time image representative of what an actual target area would look like illuminated with an actual lighting system. This, in essence, permits a user to evaluate the effectiveness of a lighting system in real time without committing to the purchase of a lighting system.

Figure 1A:
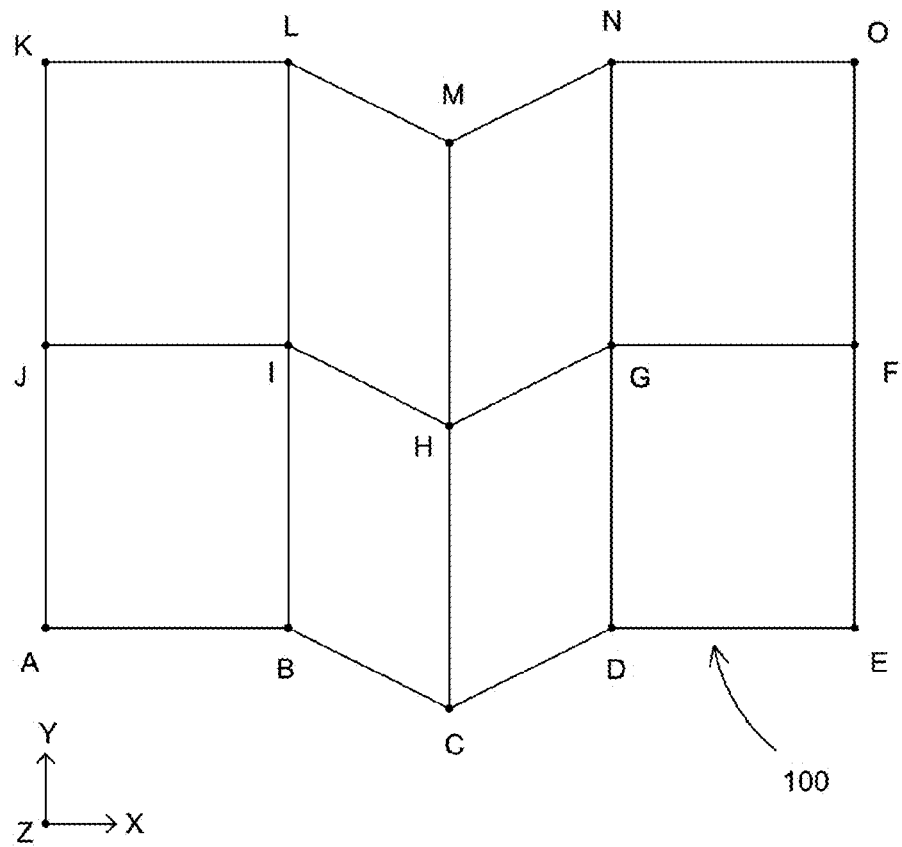

13 Claims, 25 Drawing Sheets
(3 of 25 Drawing Sheet(s) Filed in Color)

(56) References Cited

U.S. PATENT DOCUMENTS

| | | | |
|---|---|---|---|
| 5,521,853 | A | 5/1996 | Hibbs et al. |
| 5,768,415 | A | 6/1998 | Jagadish et al. |
| 5,808,620 | A | 9/1998 | Doi et al. |
| 5,905,503 | A | 5/1999 | Penna |
| 6,463,436 | B1 * | 10/2002 | Knoble ................................ 1/1 |
| 6,975,079 | B2 | 12/2005 | Lys et al. |
| 7,231,060 | B2 | 6/2007 | Dowling et al. |
| 7,458,700 | B2 | 12/2008 | Gordin |
| 7,480,035 | B2 | 1/2009 | Overbeck et al. |
| 7,500,764 | B2 | 3/2009 | Gordin |
| 7,502,034 | B2 | 3/2009 | Chemel et al. |
| 7,600,901 | B2 | 10/2009 | Gordin et al. |
| 2002/0177982 | A1 | 11/2002 | Boulouednine et al. |
| 2003/0034974 | A1 | 2/2003 | Welch et al. |
| 2003/0097309 | A1 | 5/2003 | Gibler et al. |
| 2004/0075658 | A1 | 4/2004 | Goto |
| 2004/0150641 | A1 * | 8/2004 | Duiker .......................... 345/426 |
| 2005/0248299 | A1 * | 11/2005 | Chemel et al. ................. 315/312 |
| 2006/0076908 | A1 | 4/2006 | Morgan et al. |
| 2009/0009984 | A1 | 1/2009 | Mangiardi et al. |
| 2009/0085500 | A1 | 4/2009 | Zampini, II et al. |
| 2009/0177426 | A1 * | 7/2009 | Dodds et al. ..................... 702/85 |
| 2009/0284966 | A1 | 11/2009 | Crookham et al. |
| 2009/0323330 | A1 | 12/2009 | Gordin et al. |
| 2011/0245939 | A1 | 10/2011 | Crookham et al. |
| 2011/0273369 | A1 * | 11/2011 | Imai et al. ..................... 345/158 |
| 2013/0268246 | A1 | 10/2013 | Gordin |

OTHER PUBLICATIONS

Reinhard, Erik et al., "Dynamic Range Reduction Inspired by Photoreceptor Physiology", IEEE Transactions on Visualization and Computer Graphics, pp. 13-24, vol. 11 Issue 1, Jan.-Feb. 2005.

Ward, Greg et al., "JPEG-HDR: A Backwards-Compatible, High Dynamic Range Extension to JPEG", pp. 1-8, Proceedings of the Thirteenth Color Imaging Conference, Nov. 2005.

Planet Pixel Emporium, "Reproducing the color of real world light" http://planetpixelemporium.com/tutorialpages/light.html, printed from Internet Aug. 17, 2011, 4 pages.

Wikipedia, the free encyclopedia, "Rendering (computer graphics)", http://en.wikipedia.org/wiki/Rendering_(computer_graphics), printed Internet Aug. 26, 2011, 12 pages.

Musco Corporation et al., PCT/US2011/049716, "Notification of Transmittal of The International Search Report and The Written Opinion of the International Searching Authority, or the Declaration" mailed Mar. 23, 2012.

Musco Corporation, PCT/US2013/029903 filed Mar. 8, 2013, "The International Search Report and The Written Opinion of the International Searching Authority, or the Declaration", mailed Jun. 26, 2013, 12 pages.

* cited by examiner

```
LUMINAIRE Type 4M 7" Visor: die cast
aluminum reflector housing, specular hammered and specular
aluminum inserts around interior of housing, specular
aluminum assembly below lamp; flat
glass enclosure with specular hammered insert within exterior
visor
Lamp, 1500 Watt Metal Halide
MOUNTING 30 deg below horizon, arc tube horizontal
Temp. 25.1 C
1 134000 1 45 23 2  1 -1.916667 -1.916667 0.000000
1.000 1 1250.0
-90 -85 -75 -65 -55 -47.5 -42.5 -37.5 -33 -29 -25.5 -22.5 -19.5 -17 -15
-13
 -11 -9 -7 -5 -3 -1 0 1 3 5 7 9 11 13 15 17 19.5 22.5 25.5 29 33 37.5
42.5
 47.5 55 65 75 85 90
0 1 3 5 7 9 11 13 15 17 19.5 22.5 25.5 29 33 37.5 42.5 47.5 55 65 75 85
90
0 84 494 1723 13723 32133 44555 55026 61194 66303 70327 75231 84870
92629
 101858 116328 136654 159896 184716 217162 259392 309912 332599 351768
373395
 364853 317201 232066 147028 79785 40483 23193 12338 8820 5723 2783
1470 518
 265 217 60 12 0 12 0
0 72 494 1771 13808 31651 44218 54730 61026 66140 70387 75273 84870
92418
                    •
                    •
                    •
1874 1404 1211 1066 753 524 434 307 175 84 36 0 12 6 6 0
0 0 151 428 807 2488 4639 7060 9259 10910 12187 13151 13512 13163 12506
11814
 10259 6109 3910 2572 2127 2024 1934 1837 1669 1476 1355 1211 1042 874
681 639
 590 560 404 259 211 133 54 12 12 18 0 6 0
0 0 18 211 422 663 1211 1506 2121 1506 1482 1175 1054 1108 1121 1096
1066 994
 964 922 880 789 735 675 572 458 416 440 428 410 361 319 265 229 199
163 114
 66 48 12 18 24 6 18 0
0 0 0 0 96 157 205 229 265 295 307 313 313 283 283 259 247 223 211 175
175 151
 151 151 145 127 108 84 66 72 72 78 72 72 54 54 48 48 42 30 30 24 6 18
0
0 0 0 0 0 0 0 0 0 0 0 0 0 0 0 0 0 6 0 0 0 0 0 0 0 0 0 0 24 12
18 30
 36 24 12 18 18 6 12 0
0 0 0 0 0 0 0 0 0 0 0 0 0 0 0 0 0 0 0 0 0 0 0 0 0 0 0 0 0 0
0 6 6
 0 6 18 0 6 0
0 0 0 0 0 0 0 0 0 0 0 0 0 0 0 0 0 0 0 0 0 0 0 0 0 0 0 0 0 0
0 0 0
 0 0 0 0 0 0
```

FIG 3A

FIG 7F

APPARATUS, METHOD, AND SYSTEM FOR DEMONSTRATING A LIGHTING SOLUTION BY IMAGE RENDERING

CROSS-REFERENCE TO RELATED APPLICATIONS

This application claims priority under 35 U.S.C. §119 to provisional application Ser. No. 61/402,600 filed Sep. 1, 2010, herein incorporated by reference in its entirety.

I. COPYRIGHT NOTICE

The Specification and associated Figures of this application are subject to copyright protection. The copyright owner has no objection to authorized facsimile reproduction of this patent disclosure as it appears in the U.S. Patent and Trademark Office files or records, but otherwise reserves all rights to copyright and use of material herein. Copyright© 2010, 2011 Musco Sports Lighting, LLC.

II. BACKGROUND OF THE INVENTION

The present invention generally relates to the demonstration of a proposed lighting solution to a customer. More specifically, the invention relates to the rendering of an image which can be adjusted in real time according to a customer's needs so to demonstrate an achievable lighting solution without having to set up an actual lighting system.

In the current state of the art of lighting, there is typically a long lead time between when a customer determines a lighting need and when a product is installed and available for evaluation. Generally, the target area must be surveyed, a lighting design must be developed, a lighting system must be manufactured, and the lighting system must be installed on site. After all of this is complete, a customer sees the target area illuminated for the first time; if the result is undesirable, there is little recourse. Recently, there have been advancements in temporary lighting installations that permit a customer to evaluate various achievable lighting solutions before committing to a purchase; U.S. patent application Ser. No. 12/604,572, issued as U.S. Pat. No. 8,734,163 on May 27, 2014 incorporated by reference herein discloses some possible temporary lighting systems.

While temporary lighting installations help to solve some deficiencies in the current state of the art, more can be done to improve the relationship between a customer and lighting supplier by allowing a customer to provide more input at the beginning of the design process, and helping a customer to understand what variables should be considered and how they may be adjusted to address the customer's lighting needs. One deficiency that still exists in the art—even with temporary lighting installations—is that a professional must travel to the target area, set up the lighting system, wait until it is dark, start the system, and make various adjustments (e.g., to account for ambient light). This process generally takes an entire evening and so the professional must wait another day to actually demonstrate the system to the customer (and the customer must arrive after dark to view the demonstration). Additionally, while temporary lighting systems are an improvement over the current state of the art—at least in terms of demonstration ability—to alter a temporary lighting system to address a change in lighting needs can hardly be described as real-time. Often, optical components (e.g., diffusers, color gels, lenses) must be adjusted or traded out of each luminaire in the temporary lighting system before a new lighting solution can be demonstrated; by the time this is completed, the customer may have forgotten what the previous lighting solution looked like. Thus, there is room for improvement in the art.

III. SUMMARY OF THE INVENTION

Accordingly, there is a need in the art for a quick and effective way to demonstrate various lighting solutions to a customer in a manner that promotes interaction between the customer and designer without suffering from the aforementioned deficiencies in the current state of the art.

It is therefore a principle object, feature, advantage, or aspect of the present invention to improve over the state of the art and/or address problems, issues, or deficiencies in the art.

According to one aspect of the present invention, a user interface is presented whereby a user (designer, customer, or otherwise) may selectively project photorealistic lighting overlays onto an image representative of an actual target area, the photorealistic lighting overlays corresponding to photometry data from actual light sources. In this manner the user can add, change, and otherwise manipulate lighting overlays so to create a virtual lighting solution for the virtual target area which acts as a blueprint for building an actual lighting system for the actual target area.

Further objects, features, advantages, or aspects of the present invention may include one or more of the following:

a. generating a virtual target area representative of an actual target area;

b. generating virtual representations of the light projected from actual light sources;

c. selectively projecting said virtual representations of light onto said virtual target area;

d. rendering an image representative of the actual target area illuminated by an actual lighting system where the design of the actual lighting system is, at least in part, the result of one or more variables selected via the process associated with the image rendering; and e. wherein the process associated with the image rendering may:

i. take into account ambient lighting conditions;

ii. be done, at least in part, remotely;

iii. be done in real time;

iv. be done at a user's discretion; and/or v. permit comparison of multiple rendered images.

These and other objects, features, advantages, or aspects of the present invention will become more apparent with reference to the accompanying specification.

IV. BRIEF DESCRIPTION OF THE DRAWINGS

The patent or application file contains at least one drawing executed in color. Copies of this patent or patent application publication with color drawing(s) will be provided by the Office upon request and payment of the necessary fee.

From time-to-time in this description reference will be taken to the drawings which are identified by figure number and are summarized below.

Figure 1B:
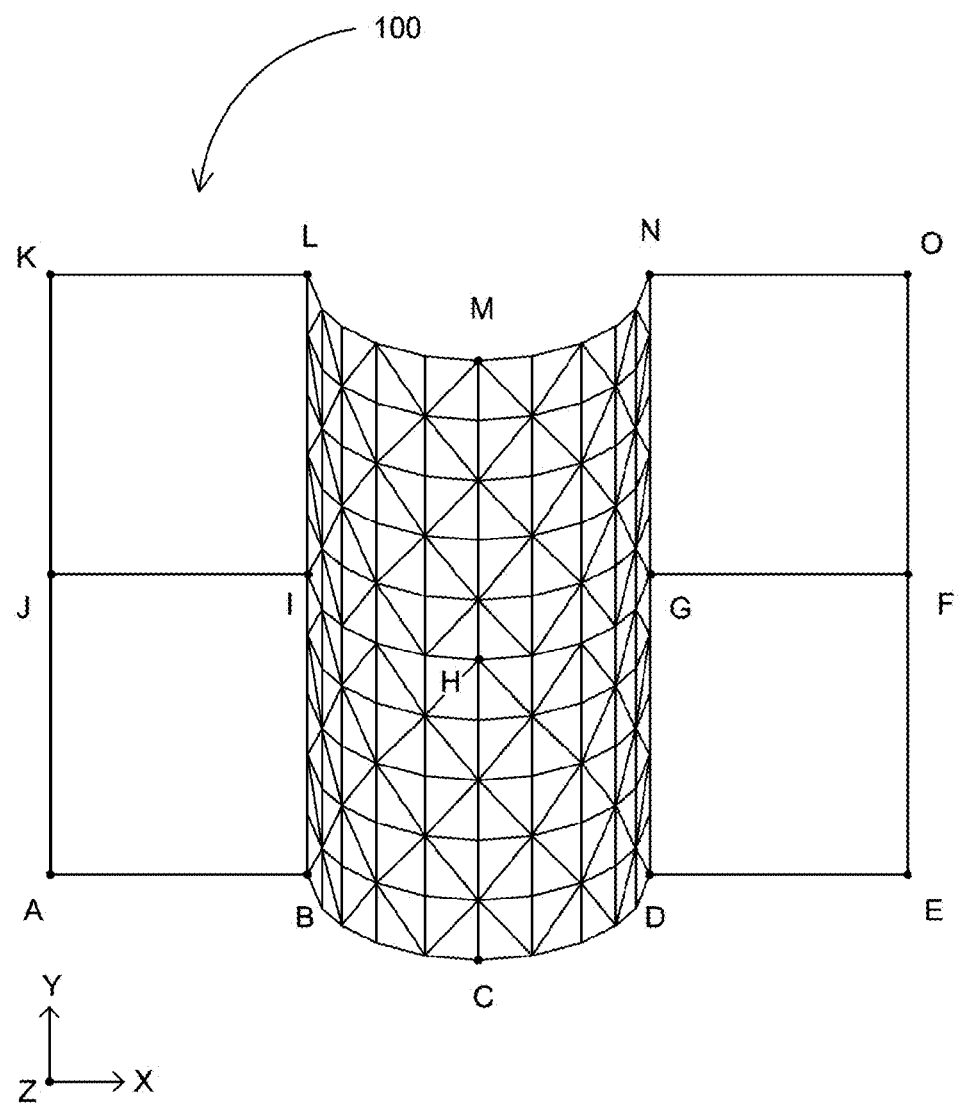

FIGS. 1A and B illustrate the characterization of a target area. FIG. 1A illustrates coordinates defining the boundaries of the target area and FIG. 1B illustrates one method of defining curvature of the areas within the boundaries of the target area.

Figure 2:
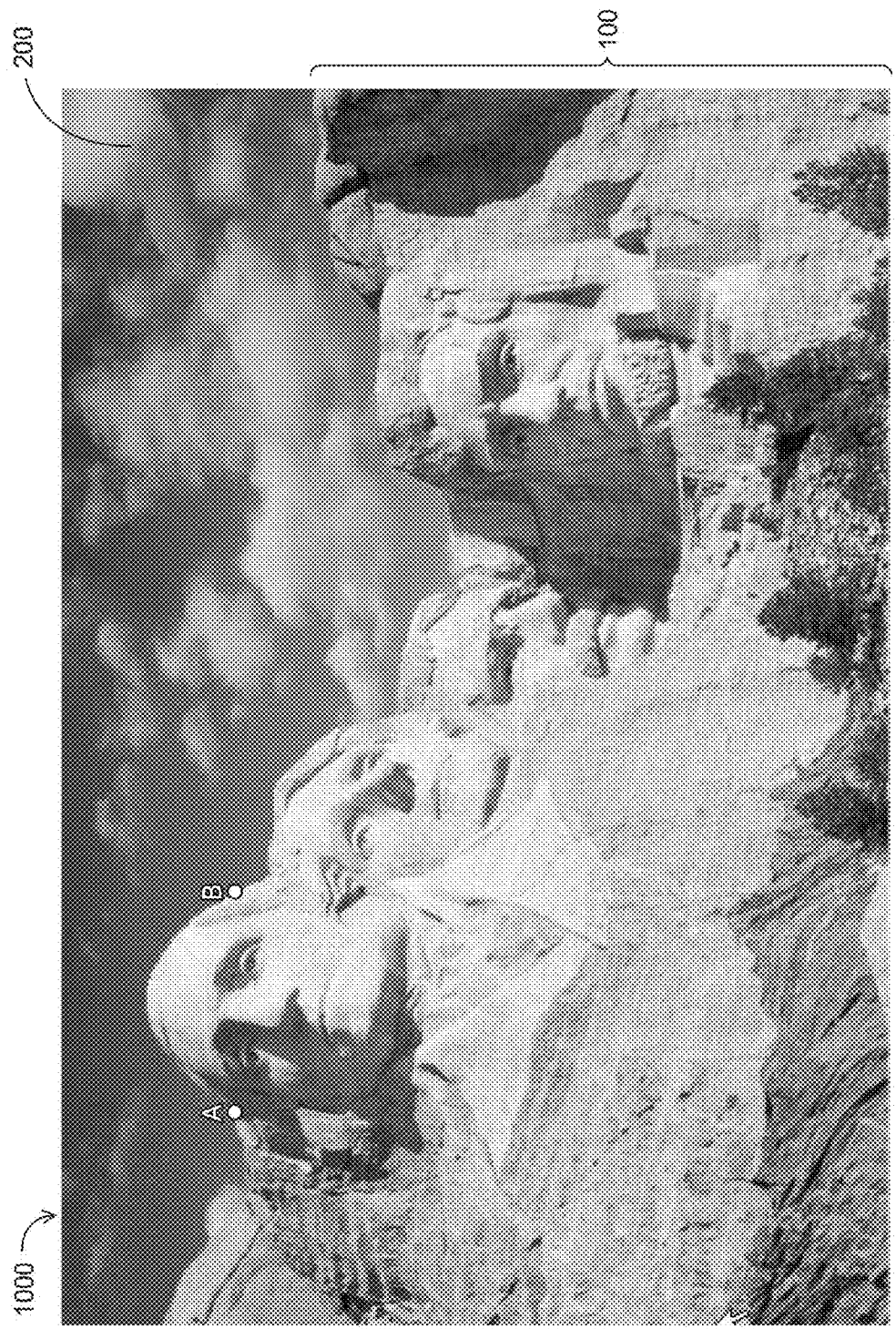

FIG. 2 illustrates the various components of a typical scene.

Figure 3B:
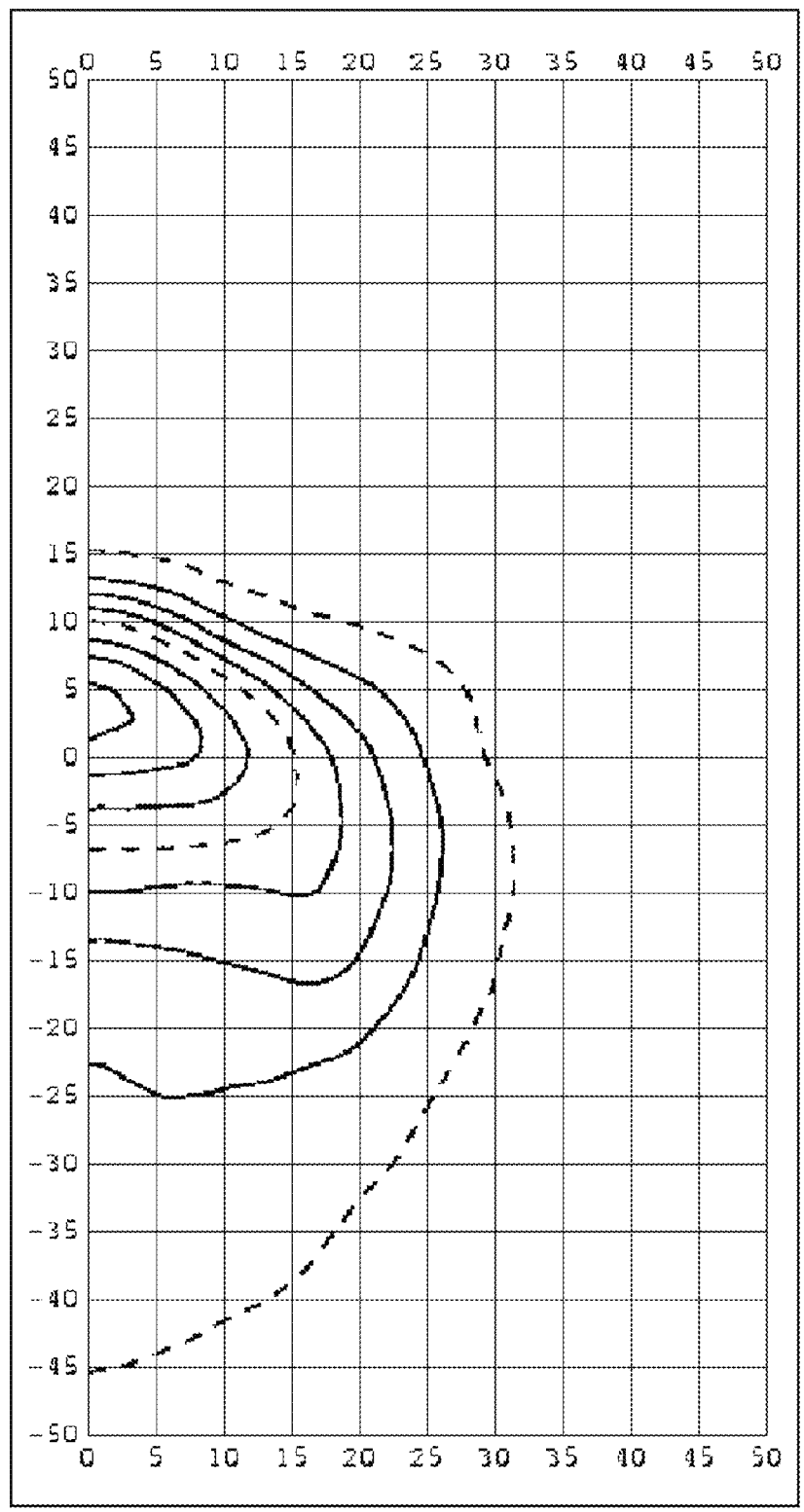
Figure 3C:
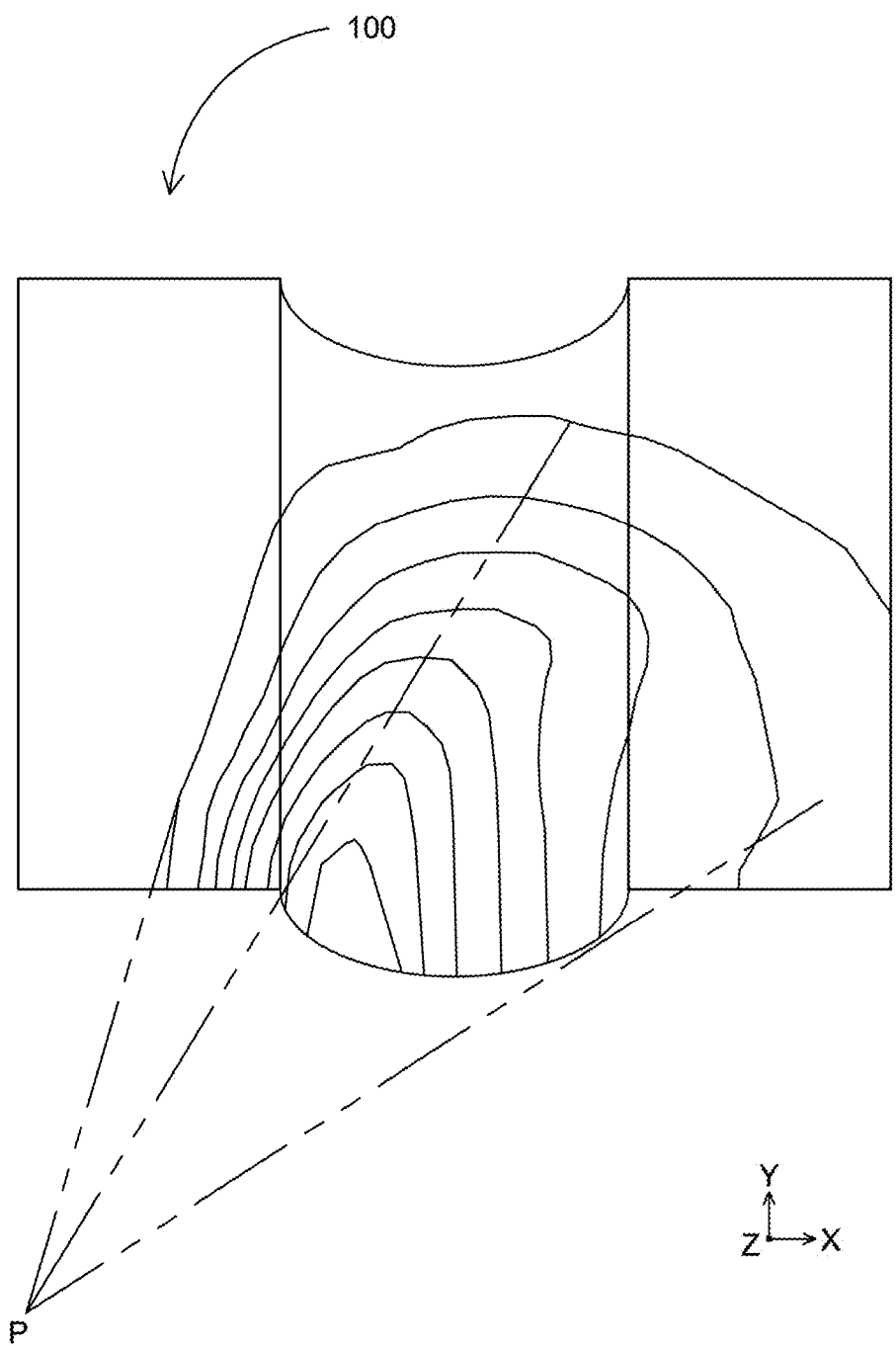
Figure 3D:
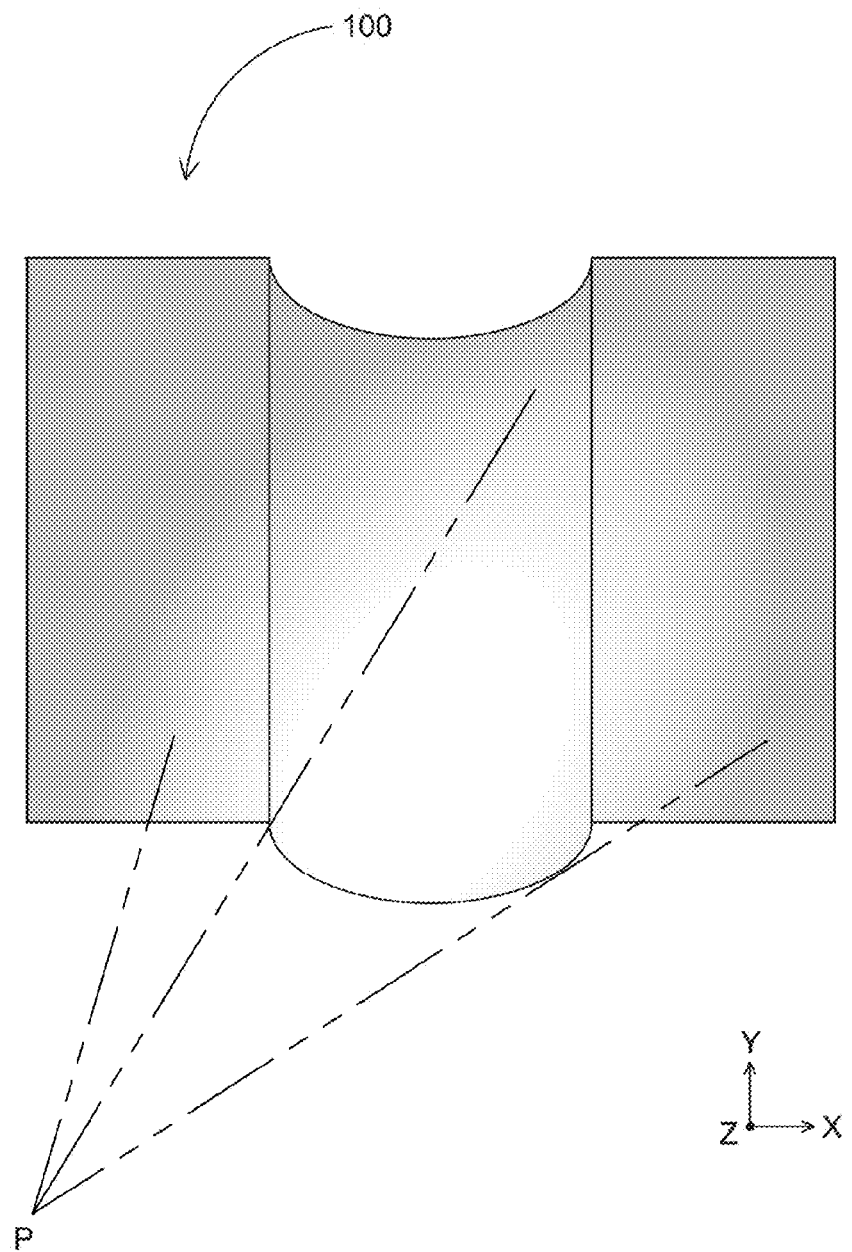

FIGS. 3A-D illustrate two possible methods of indicating illumination of a surface. FIG. 3A illustrates a portion of a typical photometric data file and FIG. 3B diagrammatically illustrates the data from FIG. 3A in the form of an isocandela diagram. FIG. 3C illustrates some of the curves from FIG. 3B projected onto the surface of the target area from FIG. 1B. FIG. 3D illustrates a lighting overlay calculated from the data in FIG. 3A projected onto the surface of the target area from FIG. 1B.

Figure 4:
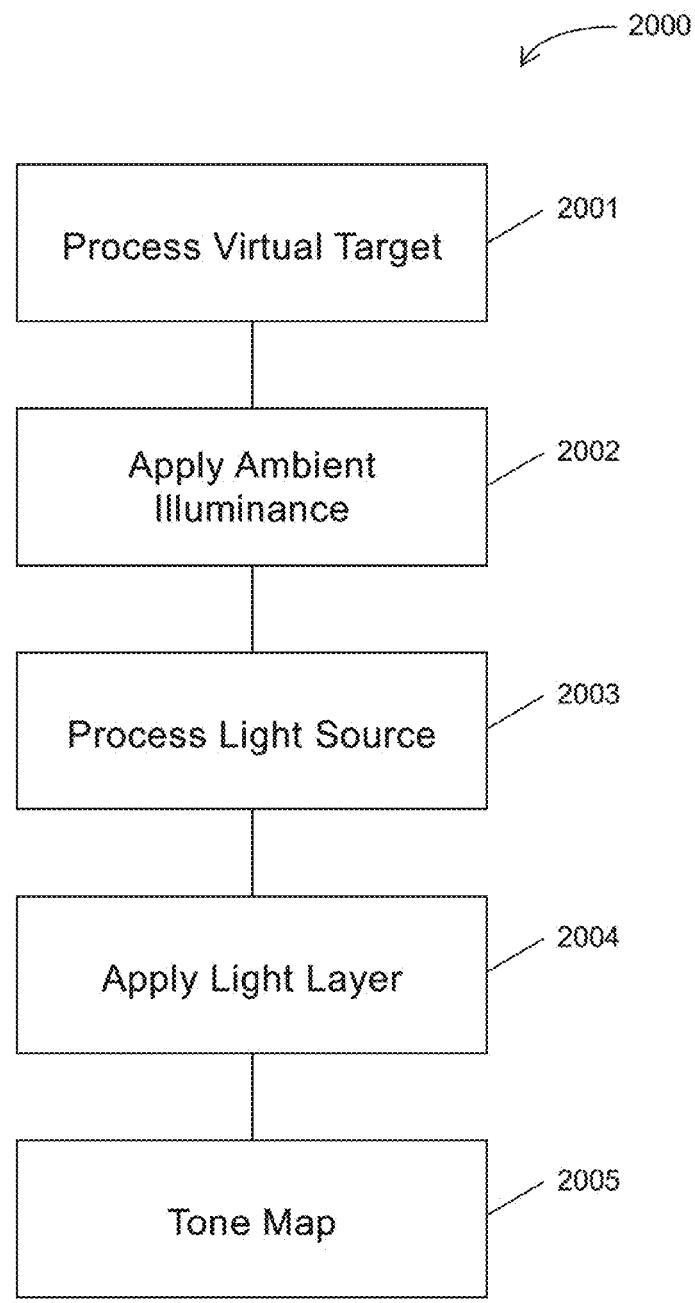

FIG. 4 illustrates one method of generating virtual representations of light for projection onto a virtual target area.

Figure 5A:
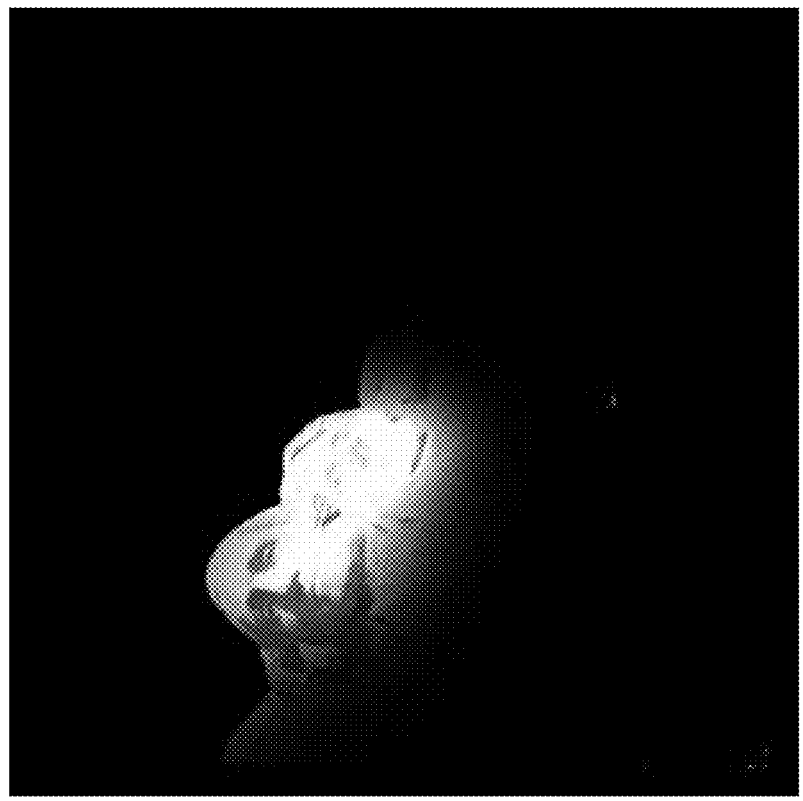
Figure 5A:
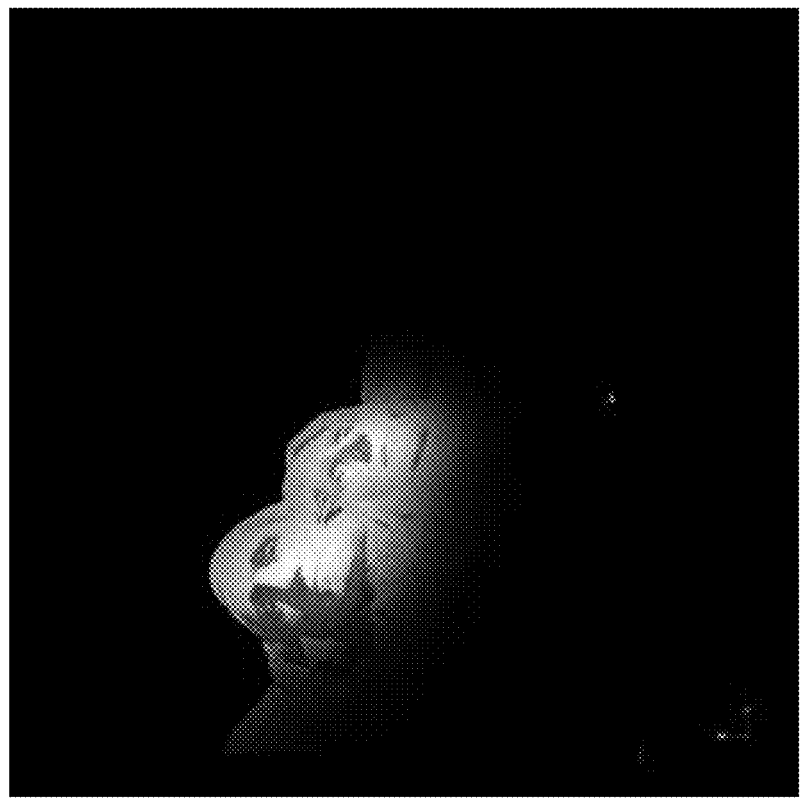

FIGS. 5A and B illustrate two possible methods of indicating the rendered image has exceeded a user-defined target illuminance.

Figure 6:
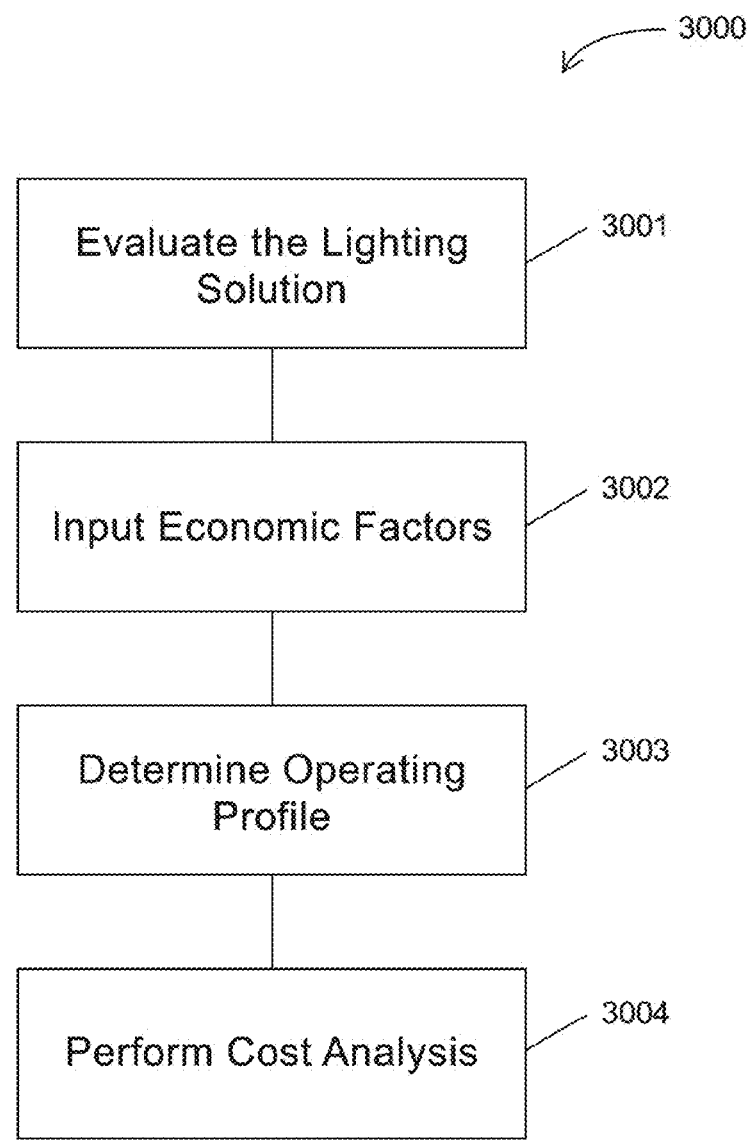

FIG. 6 illustrates one method of evaluating economic factors associated with an actual lighting system designed in accordance with a rendered image.

FIGS. 7A-G illustrate the user interface as a series of screenshots as might be encountered when visiting a website or running a computer application for the exemplary embodiment of a vertical lighting application.

FIGS. 8A-G illustrate the user interface as a series of screenshots as might be encountered when visiting a website or running a computer application for the exemplary embodiment of a horizontal lighting application.

V. DETAILED DESCRIPTION OF EXEMPLARY EMBODIMENTS

A. Introduction

To further an understanding of the present invention, specific exemplary embodiments according to the present invention will be described in detail. Frequent mention will be made in this description to the drawings. Reference numbers will be used to indicate certain parts in the drawings. The same reference numbers will be used to indicate the same parts throughout the drawings.

B. Overview

According to aspects of the present invention, a user interface is presented—implemented as software on a laptop or similar device, as one example—which allows a user to visually ascertain what an actual target area would look like illuminated with an actual lighting system, without (or prior to) installing a lighting system (whether temporary or permanent). Said user interface is designed to both (i) guide a user through a selective process by which a custom lighting solution may be created and (ii) generate information needed by lighting suppliers to develop an actual lighting system which may be installed with minimal on-site adjustments.

Generally speaking, aspects according to the present invention comprise the steps of generating a virtual target area, generating virtual representations of light for projection onto the virtual target area, and rendering an image which a user may modify in real time. Two specific exemplary embodiments are discussed—vertical and horizontal lighting applications—though these are by way of example and not by way of limitation. Further, throughout the exemplary embodiments the user interface is implemented as a series of screenshots as might be encountered when visiting a website or running a computer application; this too is by way of example and not by way of limitation.

1. Generating a Virtual Target Area

Ideally, a user—presumably a customer or end user of a lighting system, though this may not be the case—will already have an actual target area defined. Sometimes, though, a lighting system is purchased before any infrastructure is built on site. Ultimately, it is most useful if the generated virtual target area closely matches the actual target area as this increases the probability that a rendered image accurately represents the actual target area illuminated by a lighting system corresponding to variables selected during the image rendering; in essence, that what one sees is what one gets. That being said, a virtual target area may be generated even if the actual target area is not yet physically developed, given some understanding of the actual target area.

a) Uploading or Creating an Image

A user may begin defining a target area (sometimes referred to as an application area) by uploading an image (e.g., a photograph) or by creating an image (e.g., a model); the latter approach is discussed first.

As can be seen in FIG. 1A, a virtual target area 100 has been created using a Cartesian coordinate system; the use of a Cartesian coordinate system is by way of example and not by way of limitation. If the actual target area is more rounded through points B, D, N, and L virtual target area 100 may be modified to approximate curvature by introducing a plurality of 2-D objects (see FIG. 1B). In this manner a wire model of a target area may be produced and used as the virtual target area for purposes of the present invention, though a limitation is that color of the actual target area is not represented. If the actual target area includes significant detail or has multiple areas at different depths needing illumination, it may be preferable to directly import a 3-D model from any commercially available modeling software (e.g., AutoCAD® available from Autodesk, Inc., San Rafael, Calif., USA). As another example, a commercially available 3-D laser scanning device (e.g., the Photon model available from Faro Technologies, Inc., Lake Mary, Fla., USA) could be used to produce a model.

A different approach is to upload an image of the actual target area. Said image could be taken during the day or at night, though it may be preferable to capture the image during the day so to provide a better comparison against the rendered image (i.e., the final product). FIG. 2 illustrates an image taken of a well-known landmark; in this example, target area 100 is only a portion of the overall scene 1000. As will be described, a user may create zones which separate the target area (reference no. 100) from surrounding areas (reference no. 200) in a scene 1000. A benefit to this approach is that not only is color taken into account (assuming the uploaded image is in color), but the rendered image may provide more context for the user. For example, if in color and daytime, the sky would appear blue, the clouds white, the evergreen trees and other vegetation would appear generally green and brown, and the rock a variety of browns generally. If in black and white, there would be a range of gray scale from very black to very white.

Regardless of the approach taken to produce the virtual target area, it is necessary for points of interest within the image to be precisely located relative to each other. This is already addressed in the example of creating an image (as the precise distances are needed to build a model) but should be considered for the example of uploading an image. For example, the magnification of the image illustrated in FIG. 2 is irrelevant but the distance between two features (e.g., the distance between points A and B) is relevant. These measurements can be collected by any available means and methods (e.g., rangefinder, theodolite, tape measure, laser scanner, etc.). Of course, there are some devices which can both create a color image of a target area and measure distances between features of the target area.

b) Defining Aiming Locations

After the virtual target area has been defined, a user may select one or more virtual aiming locations relative to a point on the virtual target area; for example, aiming location P of FIGS. 3C and D is defined as (0, 0, 3) relative to point A of FIGS. 1A and 1B. The precise placement of virtual aiming locations may vary according to preference or in response to a limiting factor of the actual target area, or for some other reason. For example, one may place a virtual aiming location 15 feet back from the virtual target area in the user interface but if in reality 15 feet back from the actual target area would put a luminaire in the street or in a tree, this is not a viable selection. Such a selection could be prevented by the user interface itself, a person on site or otherwise familiar with the actual target area, or by persons performing a final check of the lighting solution prior to manufacturing of the actual luminaires, for example.

Once a virtual aiming location is defined (see point P in FIGS. 3C and D) the user may, via the user interface, select what and how virtual representations of light are projected onto the target area. According to one aspect of the present invention the user selects one or more luminaires to project from an aiming location; in practice, each luminaire may have a defined beam shape, size, intensity, and color, or may have some selectivity of these variables. According to another aspect of the present invention the user selects one or more beam types (e.g., round, square, elliptical) to project from an aiming location; in practice, each beam type may correlate to a luminaire, a plurality of luminaires, or even modules within a luminaire. As envisioned, the user may select size of beam, shape of beam, color, and overall intensity, though this may depend on what a lighting designer is capable of or willing to produce in an actual lighting system. For example, the user interface may be adapted to project virtual representations of light in a host of colors but if no manufacturer is willing or able to produce an actual lighting system capable of projecting light in those colors, there is little benefit to providing it as an option within the user interface. That being said, while it may be practical to limit the user selectivity with respect to beam shape, size, intensity, and/or color so to ensure the rendered image is representative of a lighting system that could actually be built, aspects according to the present invention are not limited to such.

Take, for example, the lighting device described in U.S. patent application Ser. No. 12/467,160, issued as U.S. Pat. No. 8,356,916 on Jan. 22, 2013 and incorporated by reference herein. According to one aspect of the present invention, the user interface may permit a user to select the entire luminaire to aim from a virtual aiming location. According to another aspect of the present invention, the user interface may permit a user to select a beam shape; that beam shape may correlate to LEDs 1-50 within the luminaire illustrated in FIG. 5 of the aforementioned application (182 LEDs in total are illustrated). In this manner a user may select a single virtual aiming location with four beams projected therefrom; in practice, the 182 LEDs in the luminaire could be individually aimed—each LED having an appropriate optic—so to produce a beam which is the composite of the four virtual beams selected in the user interface. So whether taking a bottom-up approach where beams are built up to create a lighting solution and a lighting designer (or other person) must determine how to craft one or more luminaires which can produce the lighting solution, or whether taking a top-down approach where luminaires are selected to create a lighting solution and a lighting designer (or other person) must determine how many and what types of luminaire to make selectable within the user interface; it can be seen that the degree to which a lighting solution may be customized is not limited by the user interface, but by the options one makes available in the user interface.

That being said, the mechanics of aiming virtual light sources from the virtual aiming locations may differ depending on whether a virtual representation of light corresponds to the light output from a module, a luminaire, a collection of luminaires, or otherwise. So for the example of a user selecting a virtual representation of light corresponding to the actual light output from a luminaire, when the aiming location is defined the virtual light source's aiming may be computed using spherical coordinates where the orientation and tilt are defined but the spin is maintained at 0°; this may be done to more closely mimic the behavior of an actual luminaire. In practice, an actual luminaire corresponding to a virtual light source would likely be rotated (corresponding to orientation), and tilted (corresponding to tilt) but not spun (corresponding to spin).

2. Generating Virtual Representations of Projected Light

Each user-selected virtual light source has a corresponding photometric data file; this is true regardless of whether the light source correlates to a module, a luminaire, a collection of luminaires, or otherwise. In practice, the user interface is likely a software function on a laptop or other portable device; if so, the photometric data files could be stored on the laptop, stored on a storage device (e.g., flash drive), or stored remotely and accessible via a communication network, for example. Regardless of the location of the photometric data files, when a user selects a virtual light source within the user interface the user interface is adapted to find the photometric data file associated with that light source and calculate a photometric projection pattern. As envisioned, the calculated photometric projection pattern may manifest as isocandela diagrams or photorealistic lighting overlays. Regardless of how the photometric pattern is manifested, the user may—via mouse or some other control device—add, delete, aim, or otherwise manipulate the pattern so to create a layer of lighting on top of the virtual target area.

This aspect of the present invention is important to note because the layering permits the user to create a lighting solution in real time. The time-intensive lighting calculations (i.e., point-by-point illuminances) typically required to make use of photometric data are no longer required because, in essence, the creation of the photometric projection patterns take into account candela data (which is direction dependent). The photometric projection patterns are merged with the underlying image to create the rendered image thereby greatly simplifying the process as no additional photometric calculations are required—regardless of the aiming of the virtual light source.

Thus, the generation of visual representations of light may generally be described according to process 2000 illustrated in FIG. 4. As a first step (reference no. 2001) the virtual target area is processed; specifically, to break down each pixel of the virtual target area into red, green, and blue (RGB) components. As a second step (reference no. 2002) ambient illuminance is recorded at each pixel of the virtual target area; in essence, adding a shared exponent thereby converting the system to an RGBE format.

As a third step (reference no. 2003) the user-selected light source is processed to (i) break down the color rendering index (CRI) and correlated color temperature (CCT) of the light source into RGB components and (ii) create the photometric projection pattern. Principles of defining actual light sources in terms of RGB components for image rendering is described in the following online tutorial, the disclosure of which is incorporated by reference herein: HASTINGS-TREW, J., "Reproducing Real World Light" [on-line] [retrieved on Aug. 17, 2011]. Retrieved from the Internet: <URL:http://planetpixelemporium.com/tutorialpages/light.html>.

As a next step (reference no. 2004), another layer of lighting is applied to the virtual target area (the first being the ambient illuminance, if any). The execution of step 2004 depends on how the user chooses to present the photometric projection patterns (i.e., isocandela diagrams or photorealistic lighting overlays); both approaches are discussed below. As a final step (reference no. 2005), the layered image is tone mapped to what a human eye would see; principles of tone mapping are described in the following publication, the disclosure of which is incorporated by reference herein: Reinhard, E. and Devlin, K., "Dynamic Range Reduction Inspired by Photoreceptor Physiology", IEEE Transactions on Visualization and Computer Graphics, vol. 1, issue 1, pp. 13-24 (2005). In one example, defaults for tone map variables are set to the following, though as envisioned, a user may adjust said variables within the user interface: contrast (m)=0.3, intensity (f')=0.0, chromatic adaptation (c)=1.0, and light adaptation (a)=0.0.

a) Isocandela Diagrams

As one option, a user may select photometric projection patterns in the form of isocandela diagrams. FIG. 3A illustrates a portion of a typical photometric data file according to standard testing procedures per the Illuminating Engineering Society of North America (IESNA); LM-35 is one such testing procedure for floodlight-type luminaires. FIG. 3B illustrates a typical isocandela diagram based on the data from FIG. 3A; such diagrams are well known in the art of lighting. FIG. 3C illustrates the isocandela diagram from FIG. 3B projected onto target area 100 of FIG. 1B from virtual aiming location P. The importance of knowing a precise relationship between features within a target area is clearly illustrated in FIG. 3C; note the stretching of the isocandela diagram across target area 100.

In practice, for each user-selected virtual light source the layer of lighting according to step 2004 comprises one or more visual contour curves corresponding to an isocandela diagram. If desired, only portions of an isocandela diagram could be projected onto the virtual target area; for example, just the contour curves correlating to the beam and field angles (shown as dotted curves on FIG. 3B) could be projected onto target area 100 so to reduce visual clutter.

b) Photorealistic Lighting Overlays

As another option, a user may select photometric projection patterns in the form of photorealistic lighting overlays. A primary objective in this approach is to mimic what the human eye would see with an actual lighting system; compare, for example the photorealistic lighting overlay of FIG. 3D to the contour curves of FIG. 3C.

In practice, for each user-selected light source the layer of lighting according to step 2004 comprises updating the illuminance at each pixel of the virtual target area. As an example, the innermost curve of the contour curves projected onto the virtual target area in FIG. 3C corresponds to a higher candela value than the outermost curve; this is well known in the art. Accordingly, the illuminance is greatly increased at the pixels in this area, less so for nearby pixels, and not at all increased for pixels of the virtual target area outside the influence of the photorealistic lighting overlay.

3. Rendering an Image

At this point, the process could be considered complete; a virtual target has been generated and virtual representations of light projected thereon—whether in the form of isocandela diagrams or photorealistic lighting overlays—thereby producing a rendered image. The rendered image may be analyzed so to produce information useful to lighting designers (e.g., aiming angle, mounting height, target illuminance, etc.)—in essence, producing a blueprint for designing an actual lighting system based on the rendered image. Analysis of the rendered image may be a function of the user interface, may be completed by the user or other person, or may be performed remotely. In the specific example of the user interface being implemented as software on a laptop, it is conceivable that analyzing the rendered image is a function of the software. After analysis, the user or other person could store the results of the analysis on a computer-readable medium or communicate the results to another device over a communications network. Regardless of who analyzes the rendered image, how the analysis is stored, or how the analysis is communicated, the result is a tangible product that describes—in terms well understood in the lighting industry—the more intangible lighting aesthetic a user desires. That being said, there are additional process steps which a user may find beneficial in the rendering of the image, though these are to be considered optional.

As one optional feature, the user interface may be adapted to accept a user-defined target illuminance and further, to visually indicate whether said target illuminance has been exceeded. As envisioned, visually demonstration of exceeding target illuminance may be completed two ways—via a whiteout overlay or a colored overlay—though other methods are possible and envisioned.

Figure 5B:
Figure 5B:

As a user selects and adds virtual light sources via the user interface, the user is actively building up a lighting solution. The user interface permits a user to add, delete, aim, resize, and otherwise manipulate the light sources (and virtual representations of light projected therefrom). That being said, as envisioned the user interface is not designed to prevent a user from adding so many light sources as to exceed a defined target illuminance, though the user interface could be adapted to do so. The question, then, becomes how to visually demonstrate to the user that the rendered image has "too much light" for the application—this is problematic because the human eye adapts to different light levels so quickly. One approach is to rely on visual cues to which the average viewer is typically accustomed; in this example, by adding another layer to the rendered image which modifies the RGB components (if in color) of the affected pixels so to approximate a whiteout condition. FIG. 5A illustrates the well known landmark from FIG. 2 as it might appear within the user interface; on the left is a rendered image of the landmark in which the target illuminance is not exceeded and on the right is the same rendered image but with the target illuminance exceeded (if in color this example would have subtle shades of brown, from almost white to tan, because only the curved heads in the stone mountain side are imaged). As can be seen from the rightmost image in FIG. 5A there is a noticeable absence of perceived color or detail in portions of the image which gives the impression of excessive light. Another approach is to do much of the opposite in that the added lighting layer does not remove perceived color, but adds it. As can be seen in the example of FIG. 5B, the leftmost image is the same as the leftmost image in FIG. 5A, but the rightmost image of FIG. 5B could show areas of exceeded target illuminance as one color, e.g., red (just the right-most head) whereas areas of the scene which meet or are below the target illuminance could be another color, e.g., green (the left-most head, neck, and a thin portion around the bottom of the right-most head). If desired, the user interface could be adapted so to show areas that have unacceptably low illuminance as red or some other color.

As has been previously stated, a benefit of the present invention is the capability to demonstrate in—real time— what is achievable with an actual lighting system without, or prior to, installing an actual lighting system. Accordingly, it may be beneficial for the user to compare economic factors associated with each virtual lighting solution so to balance what is achievable with what is cost-effective; this illustrated in FIG. 6 according to method 3000. As a first step (reference no. 3001) the user-defined lighting solution is analyzed to determine how the actual lighting system might be designed; this is similar to analyses already described but focusing more on factors that affect the cost of owning and operating a lighting system (e.g., capital cost, efficacy). As a second step (reference no. 3002), the user or other person may input economic factors to be considered; local utility rates, inflation rates, applicable taxes, and the like are but a few examples. As a third step (reference no. 3003) the user or other person may input information regarding the operation of the actual lighting system; hours operated per evening, days operating, dimming schedule for off-season play, and the like are but a few examples. Finally, given all this information a cost analysis may be performed according to step 3004; capital cost, yearly operating cost, cost of replacing the system, and the like are but a few examples of useful economic information.

C. Exemplary Method and Apparatus Embodiment 1

A specific exemplary embodiment utilizing aspects described above is illustrated in FIGS. 7A-G. In the present embodiment the actual target area is a vertical surface, in this example the front face of a building, and the user interface is presented as a series of screenshots as might be encountered when visiting a website or running a computer application.

Figure 7A:
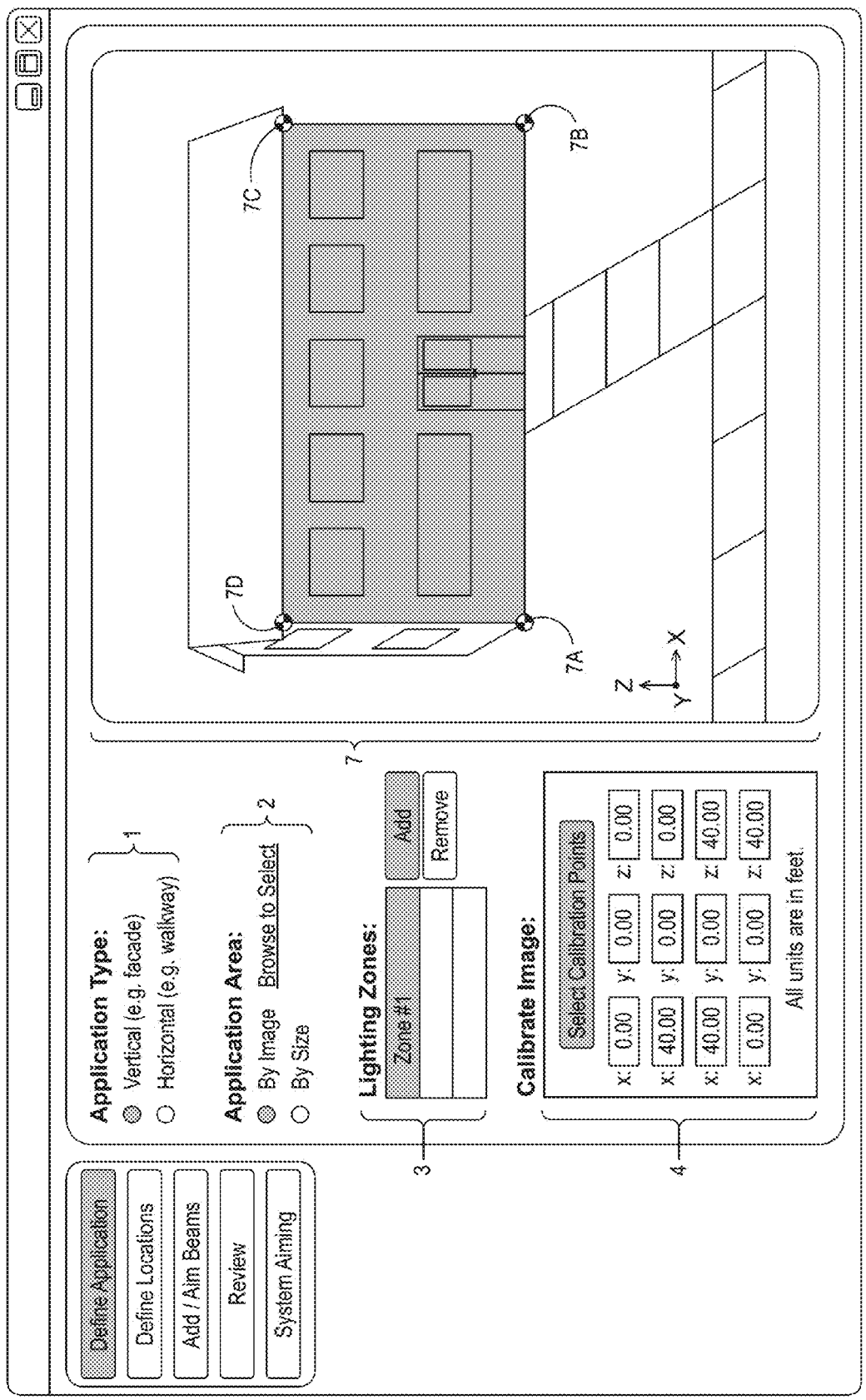

As can be seen from FIG. 7A, the user has selected the appropriate application type (reference no. 1) and chosen to upload an image of the target area (reference no. 2); though in this specific example it is merely an image of a wireframe model. The user has chosen to treat the entire storefront as the target area and defined a single zone (reference no. 3); the points defining the zone are user-selected (reference no. 4) and the results are overlaid on the scene (reference no. 7). In some situations it may be preferable to designate multiple zones; for example, if the target area includes areas with recesses (i.e., setback).

Figure 7B:
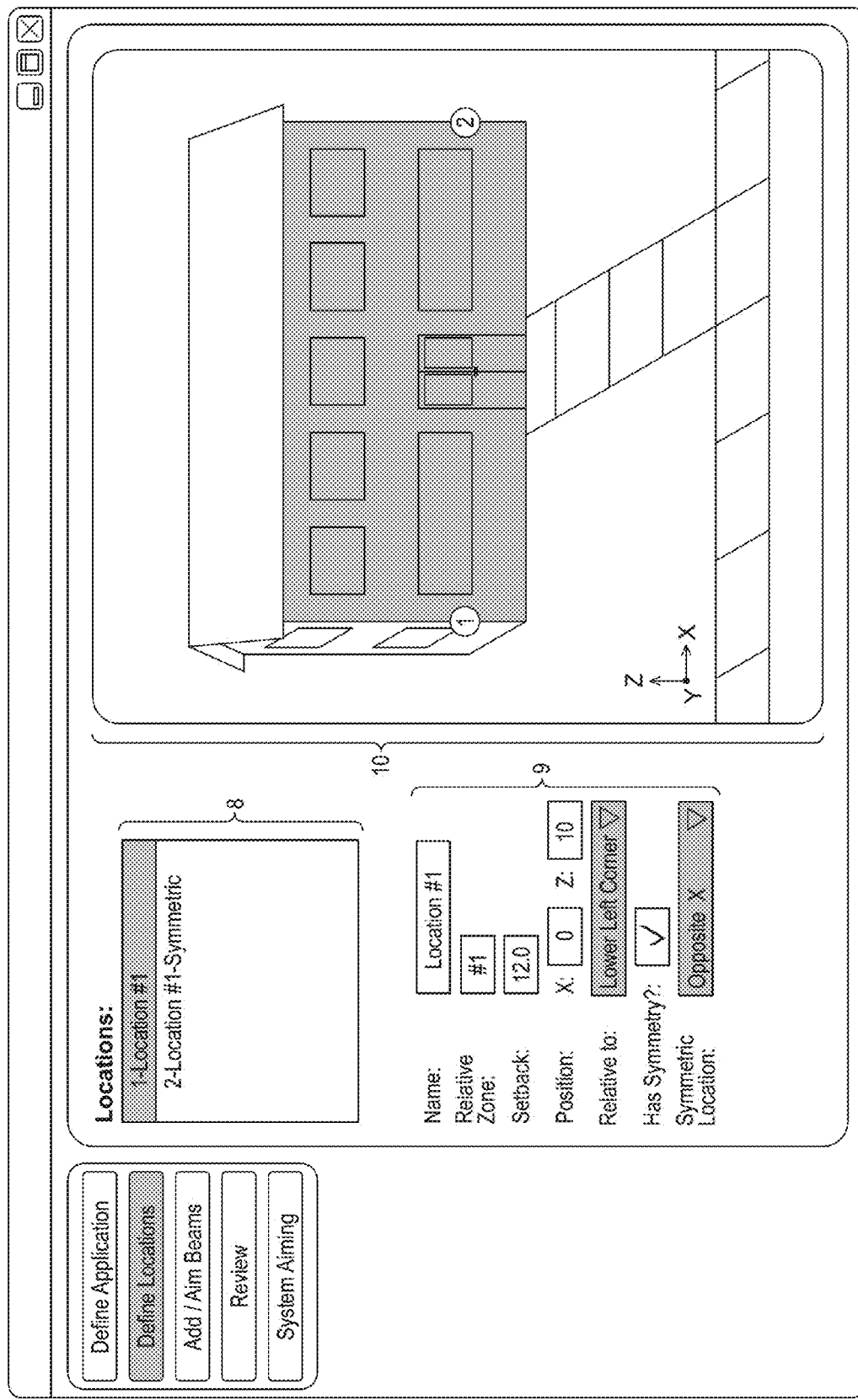

After the virtual target area has been generated the user is able to define aiming locations via the Define Locations tab. As can be seen in FIG. 7B, the user has chosen a single aiming location (reference no. 8), the position defined relative to the lower left corner of the virtual target area (reference no. 9). Because the user has defined the single location as having symmetry, a second aiming location appears on the scene (reference no. 10); in this example, on the opposite side of the x-axis (i.e., mirrored about a line extending along the z-axis and bisecting the virtual target area). Defining a symmetric aiming location is useful for applications where the user desires a look of uniformity both in lighting and in the placement of luminaires. If desired, the user—via a mouse or other control device—may rotate the virtual target area (reference no. 10) so to view the aiming locations from different angles.

Figure 7C:
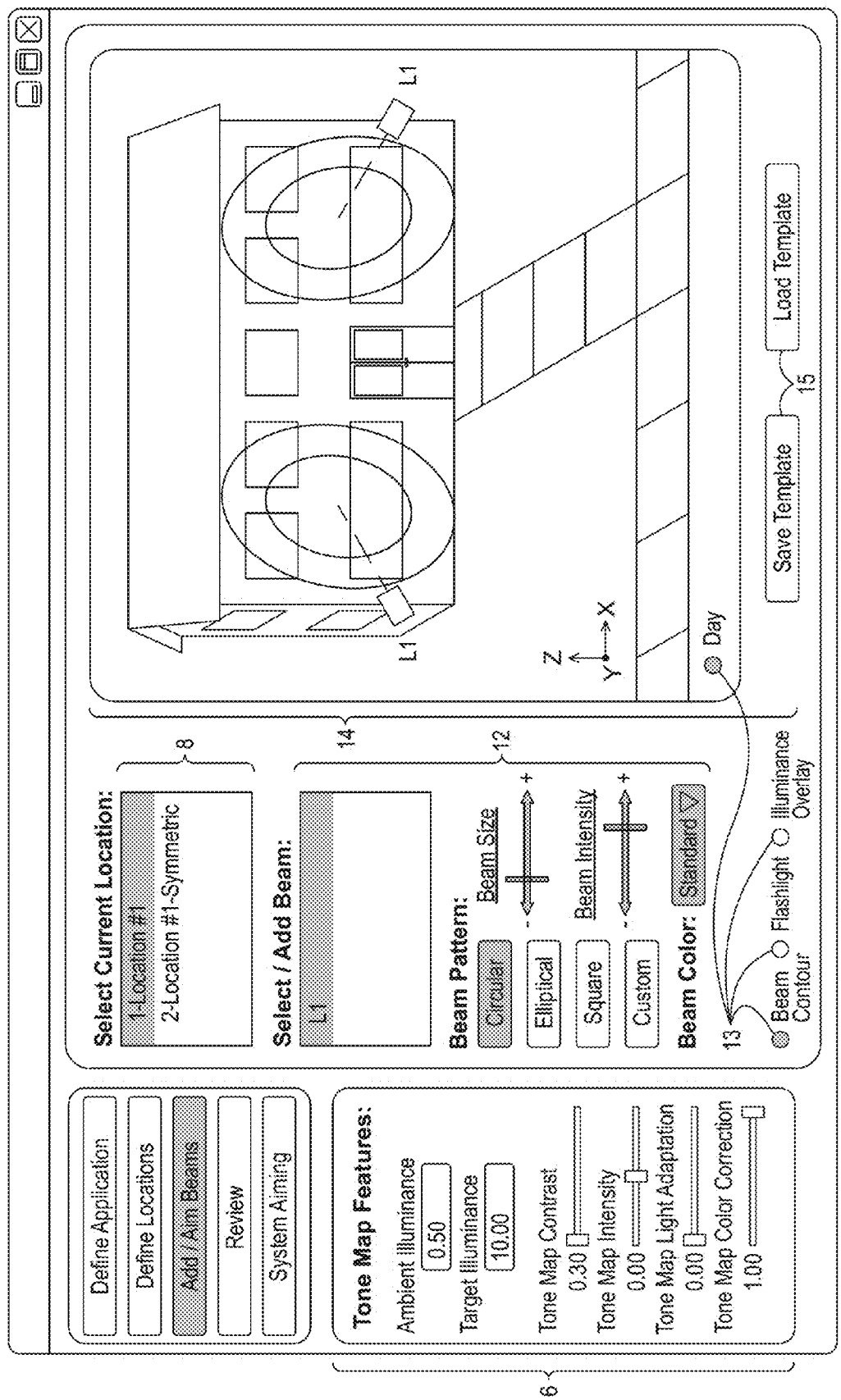

After defining aiming locations, the user is able to generate virtual representations of light to project from said aiming locations by selecting the Add/Aim Beams tab. As can be seen in FIG. 7C, the user has selected a circular shaped beam of a specific size, intensity, and color (reference no. 12); note that because symmetry was selected on the previous tab, a corresponding beam appears projected from the mirrored aiming location. In practice, when symmetry is selected the second beam moves in unison and in a mirrored fashion to the first beam.

As envisioned, the user has some selectivity regarding color; this may comprise simply choosing between commercially available light sources (e.g., a cool white LED versus a warm white LED as they are commonly defined in the industry) or may be as complex selecting a type of light source (e.g., metal halide, LED, HPS, etc.), color temperature of light source, and color gel for use with the light source. Again, the user interface is only limited by what a lighting designer can or will provide, and how closely one expects the rendered image to match the actual target area illuminated with an actual lighting system. As can be seen from reference no. 13, the user has selected beam contours (i.e., isocandela diagrams) for projection onto the virtual target area (reference no. 14); for the sake of brevity only the contour curves corresponding the beam angle and field angle are illustrated.

Figure 7D:
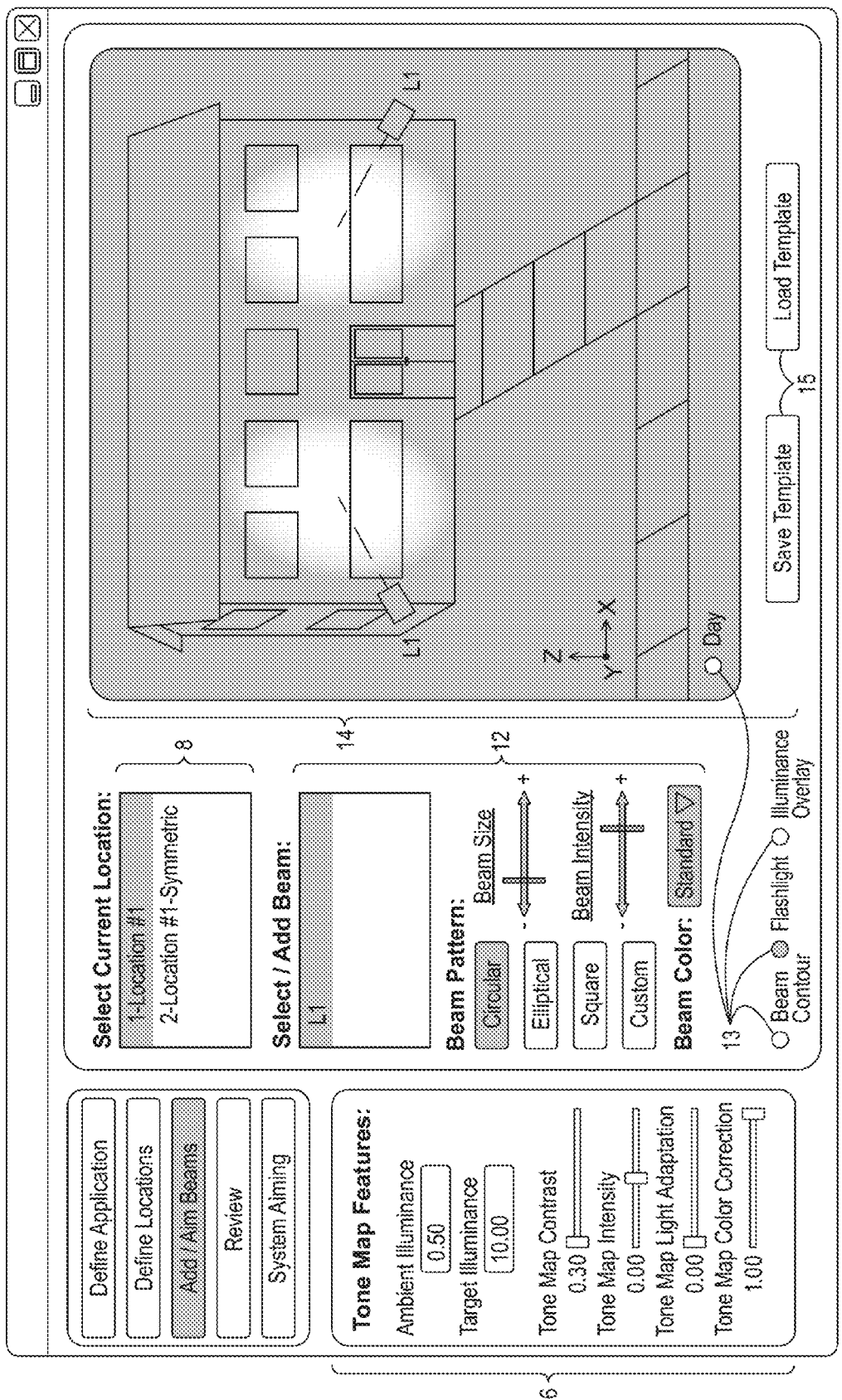

As can be seen in FIG. 7D, the user is still on the Add/Aim Beams tab but has now selected the flashlight mode (i.e., photorealistic lighting overlays) with the scene itself appearing as it might at night (reference no. 14). If the user changes ambient illuminance (reference no. 6) the result will be a change in the apparent light level of the scene (reference no. 14). With further respect to the tone map features of reference no. 6, it is of note that the variables used in the tone map calculation (i.e., contrast, intensity, light adaptation, and color correction) need not be adjustable, particularly for novice users. That being said, it may be preferable to have the variables adjustable as it is unlikely that one set of values will always render the most accurate image.

Figure 7E:
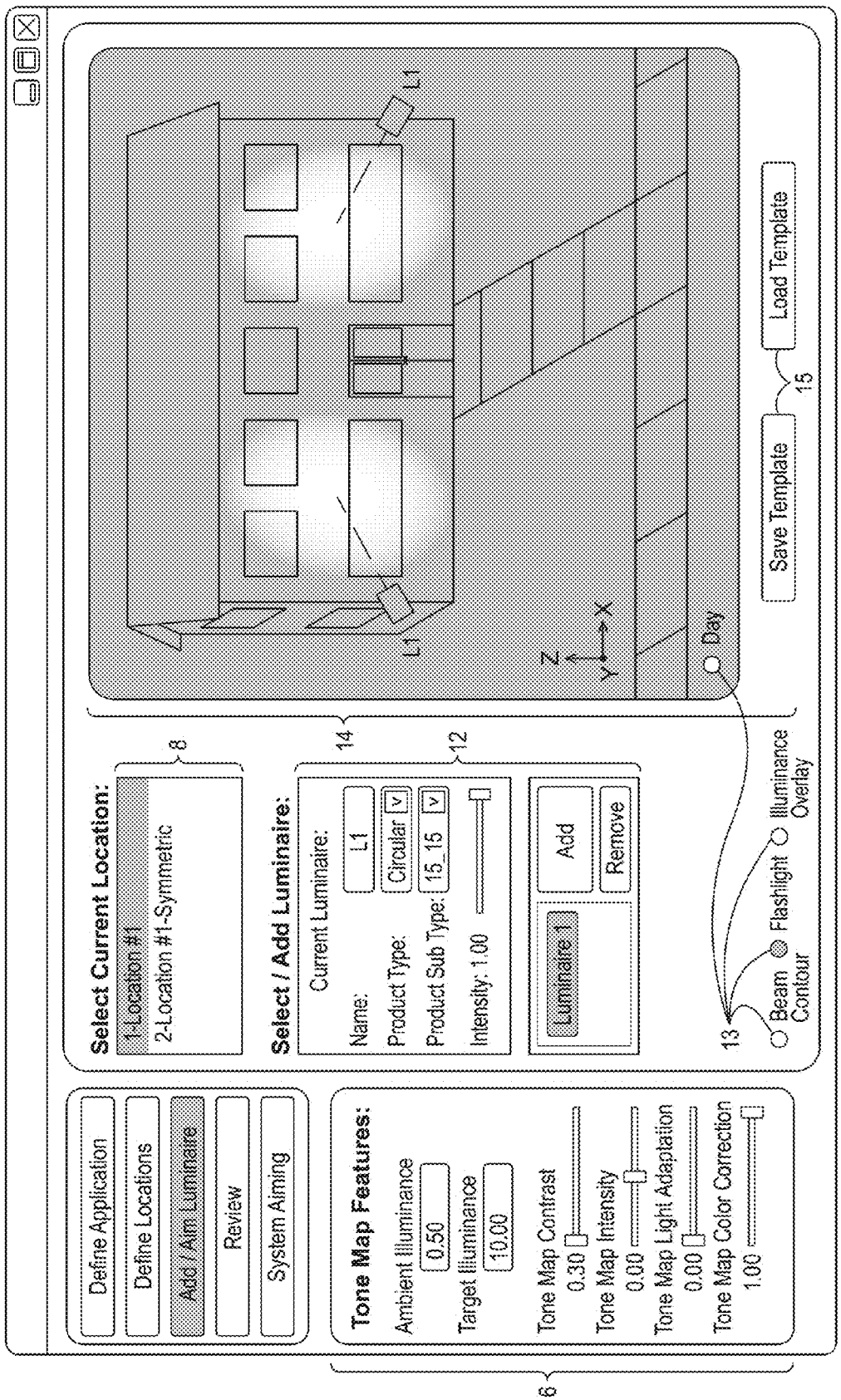

As can be seen in FIG. 7E, the user has still selected the flashlight mode (i.e., photorealistic lighting overlays) with the scene itself appearing as it might at night (reference no. 14), but the selectable options have been restricted to luminaires (reference no. 12). Alternatively, a hybrid approach could be taken in which a user first selects a luminaire but is then able to aim the light sources contained within the luminaire; for example, if a luminaire contained four rows of LEDs, a user may be able to select a single virtual light source but exert some control of the four corresponding projection patterns.

Regardless of the exact layout of the Add/Aim tab or the selectable options therein, operation of the user interface is the same—the user may add or delete virtual light sources, choose defining characteristics from available selections, and use the mouse (or other control device) to aim said light sources. If desired, the user has the option of saving the collection of aimed light sources and aiming locations as a template (reference no. 15) for use with other virtual target areas/scenes.

Following this, the user may select the Review tab (FIG. 7F) and compare the rendered image with the original image of the target area (reference no. 16). As envisioned, the user interface is adapted to access information related to the user-selected light sources and present it in an easily understandable format (reference no. 1). As one example, the information in field 1 could be included in the photometric data file such that the user interface need only extract information from a single file location in response to the selection of a virtual light source. If desired, cost information (reference no. 17) and usage information (reference no. 18) may also be displayed. As envisioned, the information in field 1 is fixed (as it is corresponds to the specific lighting solution) and the information in fields 17 and 18 are input by the user (e.g., by typing directly or using the mouse or analogous device to drag the usage bars up and down), though this is by way of example and not by way of limitation.

Figure 7F:
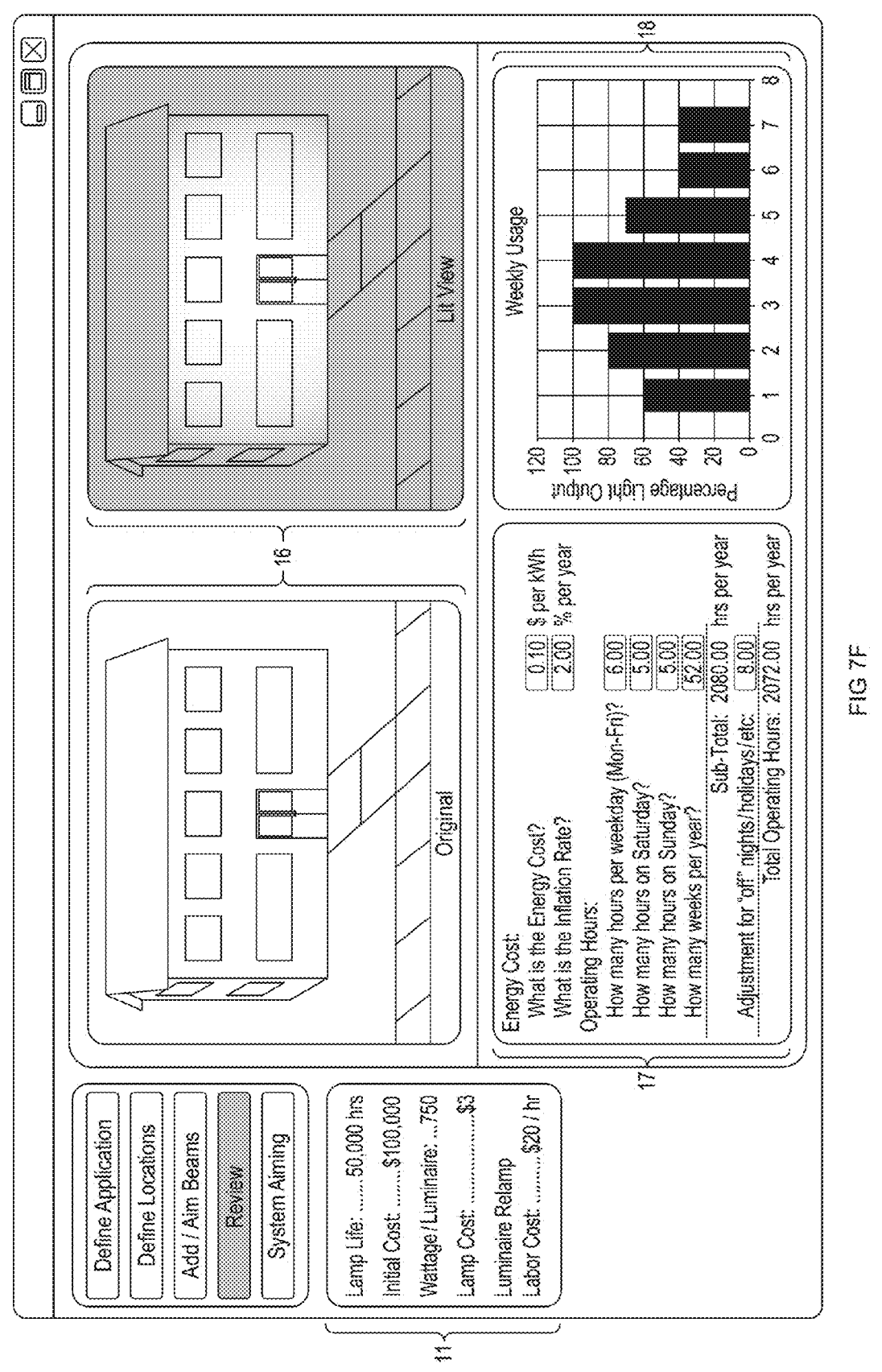

The information displayed on FIG. 7F is useful in that it helps a user to understand where the cost to operate a lighting system comes from, though it should be noted that the information displayed in FIG. 7F is merely an example and not indicative of any actual lighting system. Further, the information displayed on FIG. 7F is useful because, as envisioned, it is printable or otherwise exportable and can be used to establish a budget for purchasing an actual lighting system. Still further, the user may go back several tabs in the user interface, make changes to the lighting solution, and see (in real time, if desired) what and how economic factors are impacted.

Figure 7G:
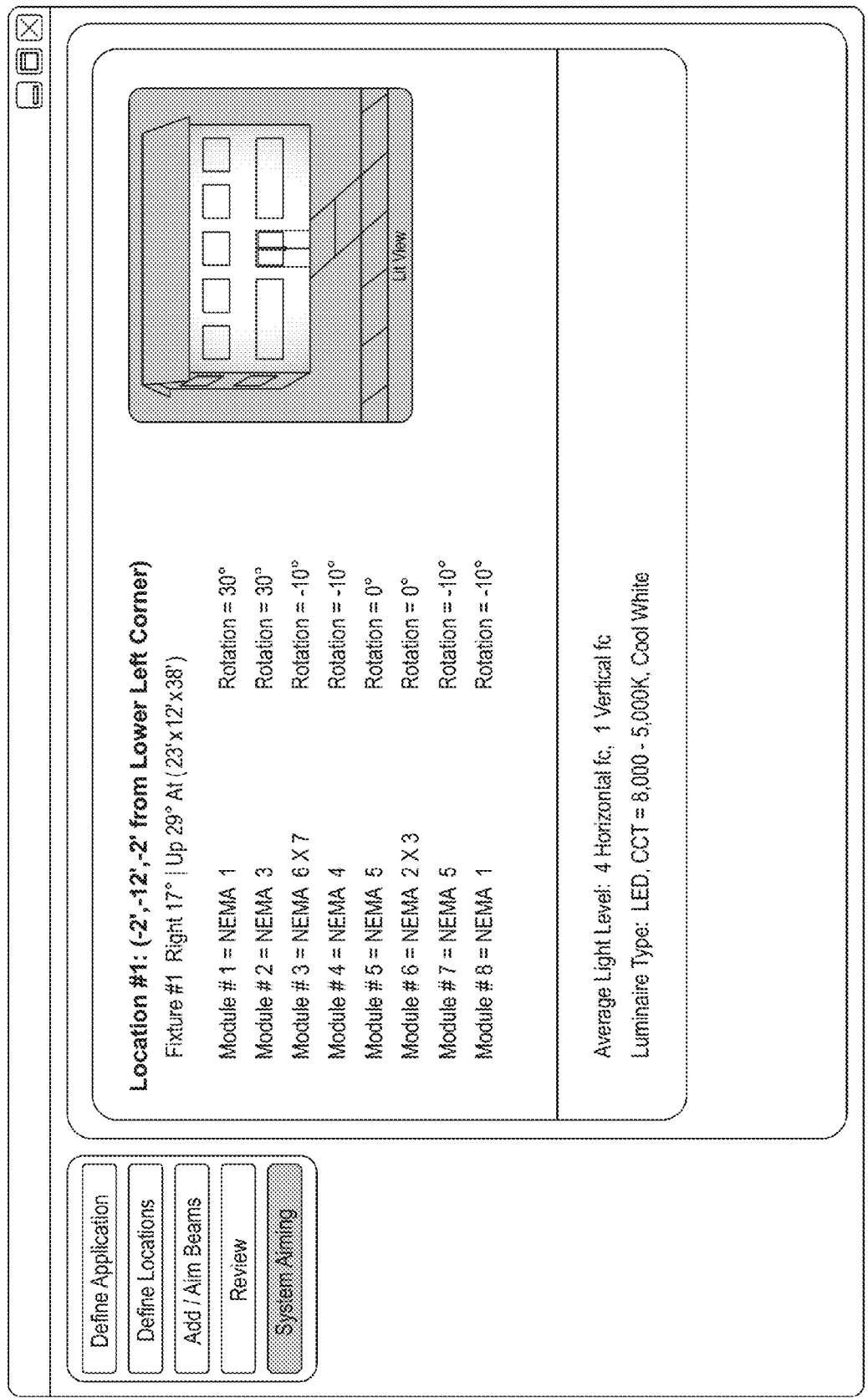

In a similar fashion, selecting the System Aiming tab permits the user to see what is physically required to produce the virtual lighting solution. The information displayed on FIG. 7G is useful because it provides a blueprint for creating an actual lighting system, though it should be noted that the information displayed in FIG. 7G is merely an example and not indicative of any actual lighting system. Further, the information displayed on FIG. 7G is useful because, as envisioned, it is printable or otherwise exportable and can be used to evaluate different lighting designers/vendors. As an added benefit, because the cost information is on a separate tab—the Review tab—the user can determine how much information to provide potential lighting designers/vendors.

D. Exemplary Method and Apparatus Embodiment 2

An alternative exemplary embodiment is illustrated in FIGS. 8A-G. In the present embodiment the actual target area is a horizontal surface, in this example the parking lot and walkways of a campus, and the user interface is presented as a series of screenshots as might be encountered when visiting a website or running a computer application.

Figure 8A:
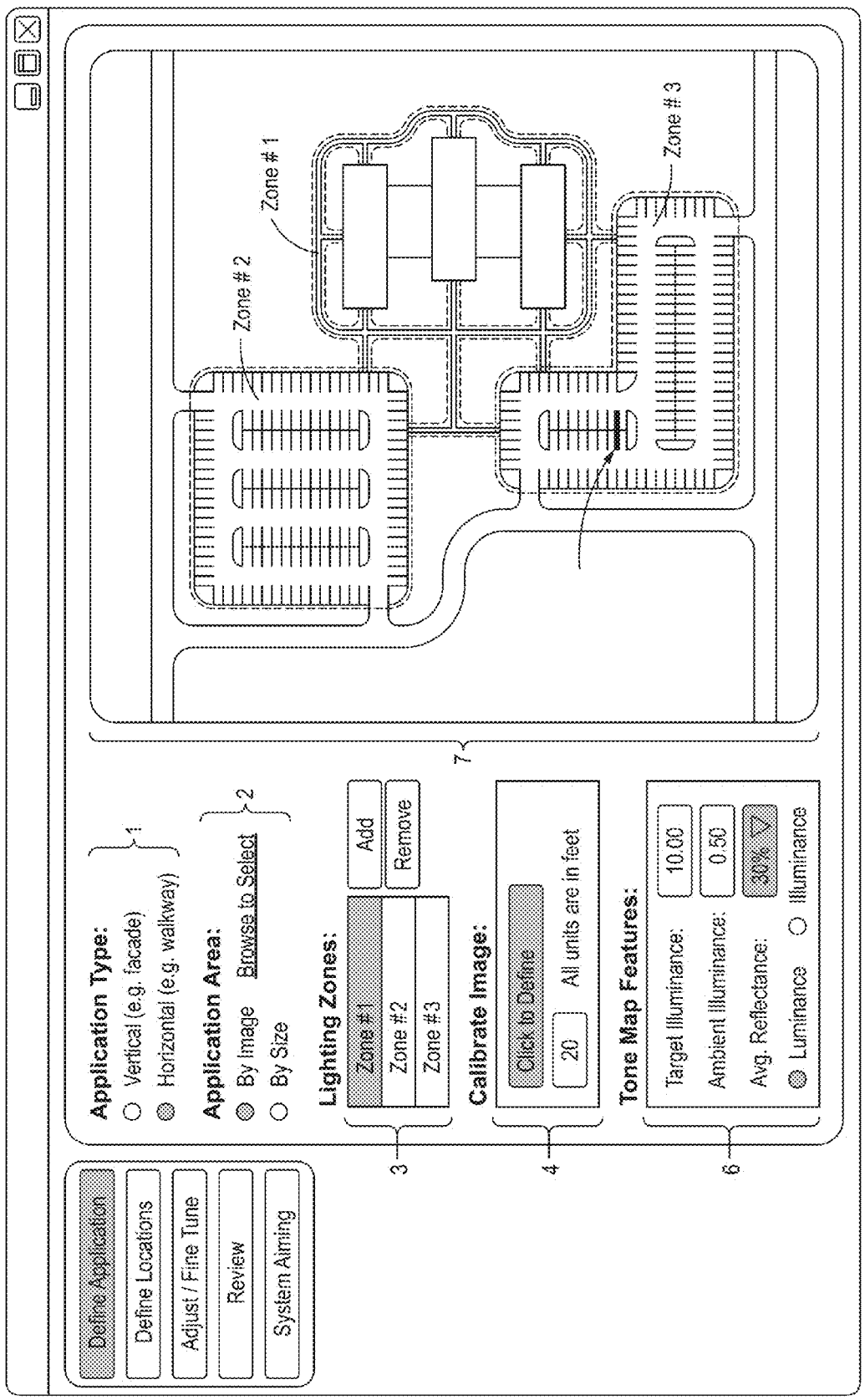

As can be seen from FIG. 8A, the user has selected the appropriate application type (reference no. 1) and chosen to upload an image of the target area (reference no. 2); though in this specific example it is merely an image of a wireframe model. In practice, the user could simply obtain an image from a commercially available mapping application such as Google® Earth. The user has chosen to create three zones (reference no. 3) and the results are overlaid on the scene (reference no. 7). Instead of defining the zone by a series of points as in the previous embodiment, the user simply drags the mouse or analogous device around the intended target area (as in zones 2 and 3) or clicks on points on the scene to create the intended target area (as in zone 1). The user then creates a calibration mark so to precisely locate the distance between features (reference no. 4); in this example, by defining the length of two parking stalls (see the arrow in image 7).

Another feature to note on the Define Application tab of the present embodiment is the selection of tone map features (reference no. 6). Because horizontal lighting applications tend to be more utilitarian than vertical lighting applications (which tend to be more aesthetically driven) there is less of a need for perfect color rendering so tone map variables are set at the aforementioned default values. That being said, the user has defined a reflectance value (e.g., to account for different materials used in different zones—for example, polished bronze versus concrete) and so the tone map calculation (step 2005 of method 2000) uses a slightly different equation.

Figure 8B:
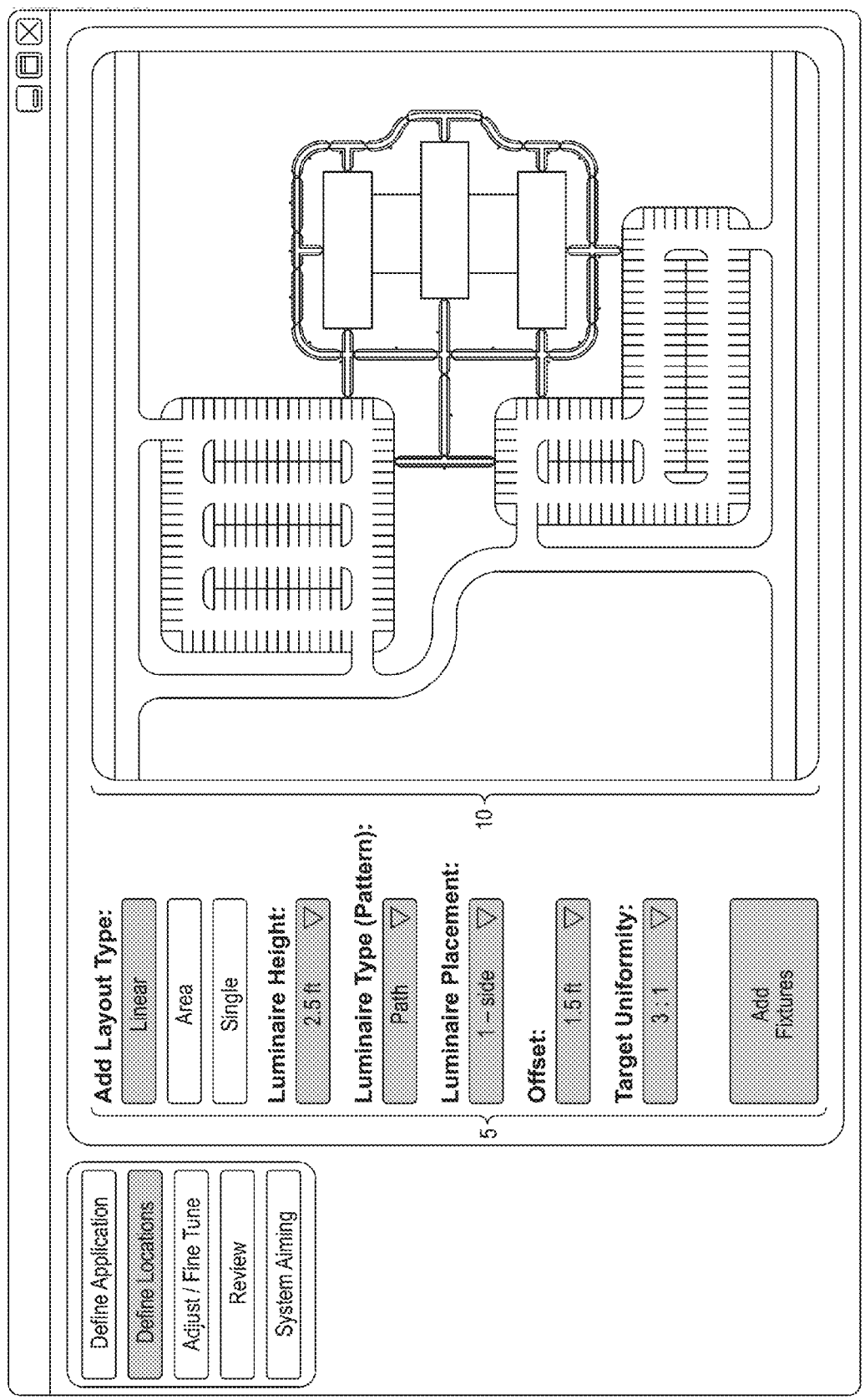
Figure 8C:
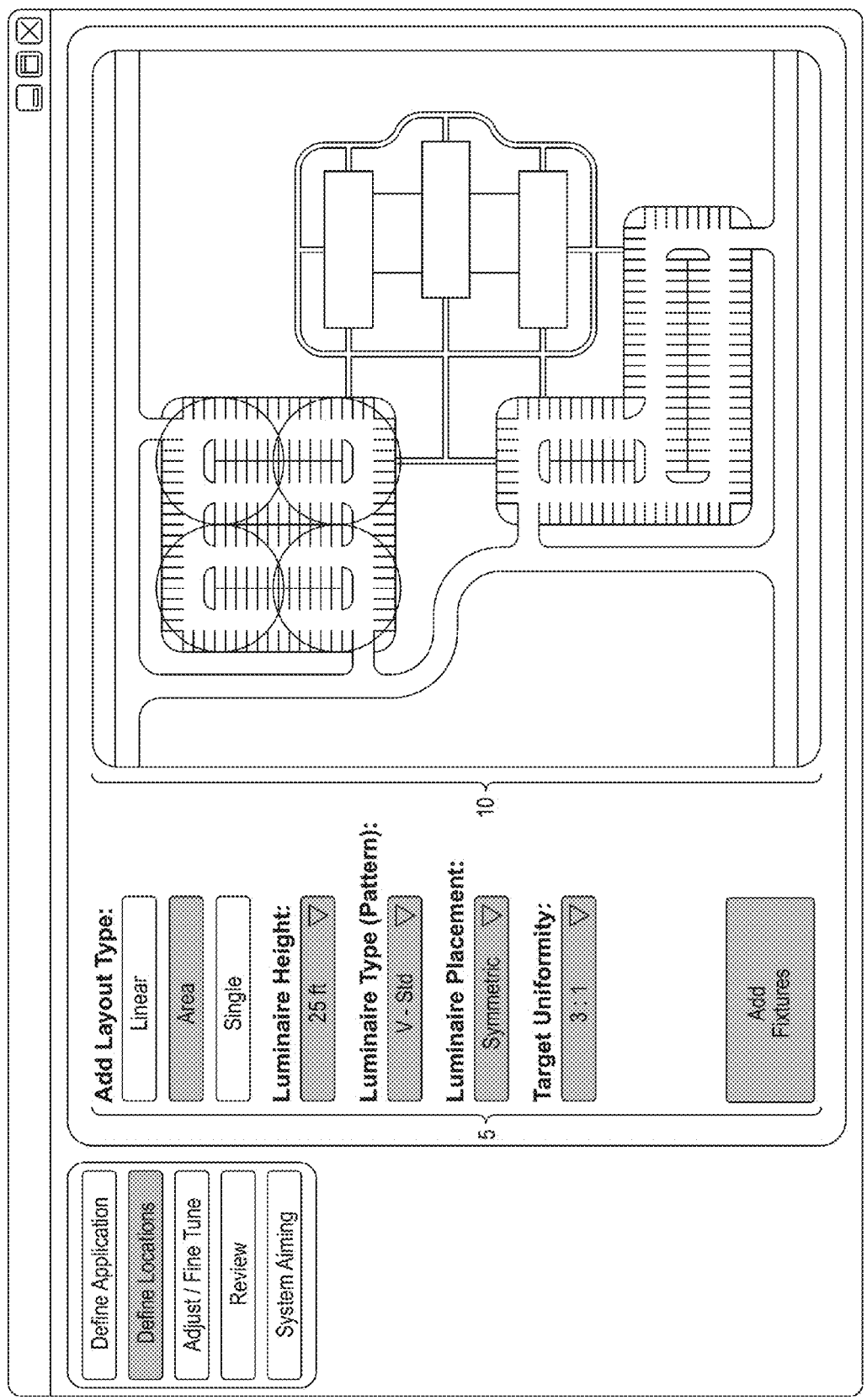
Figure 8D:
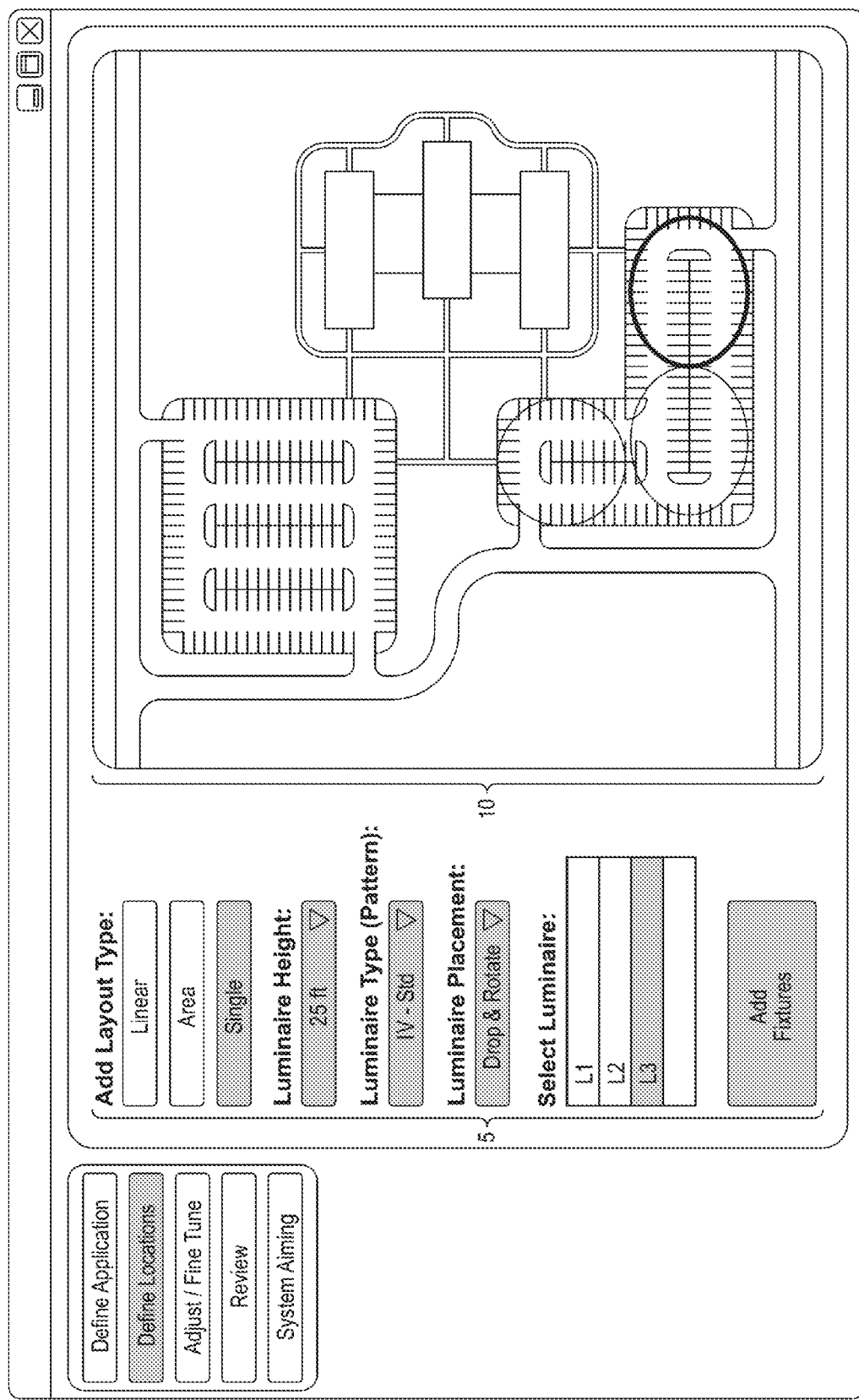

After the virtual target area has been generated the user is able to select one of three methods for defining aiming locations via the Define Locations tab; this is illustrated for in FIGS. 8B-D. FIG. 8B illustrates a first option in which a linear layout is chosen (reference no. 5) for zone $Z_1$ (reference no. 10). With the linear option the user determines the general layout (e.g., height, position relative to the virtual target area, etc.), beam type (e.g., type IV according to IESNA standards) and light level uniformity of luminaires. Following this, the user interface automatically calculates the number of luminaires necessary to satisfy the requirements and places the corresponding outlines on the scene (reference no. 10); in this example the outline corresponds to the field angle, though this is by way of example and not by way of limitation. A linear layout may be preferable when actual luminaires will be placed side-by-side, are intended to illuminate a small portion of the actual target area, or are intended to be offset from the actual target area.

Another option is to choose an area layout (reference no. 5), which is illustrated in FIG. 8C for zone $Z_2$ (reference no. 10). Similar to the linear option, the user determines the general layout, beam type, and light level uniformity of the luminaires and the user interface automatically calculates the number of luminaires needed and their placement on the scene. An area layout may be preferable when actual luminaires will be placed in a certain pattern or with a specific symmetry within the actual target area, or are intended to illuminate a large portion of the actual target area.

A third option is to choose a single layout (reference no. 5), which is illustrated in FIG. 8D for zone $Z_3$ (reference no. 10). With this option the user specifies a luminaire height and beam type and manually drops outlines—again corresponding to the field angle—on the virtual target area via the mouse or analogous device; the user may also use the mouse or analogous device to move or rotate the outlines. A single layout may be preferable when actual luminaires will be placed in specific areas, the actual target area is of irregular shape, or when the actual target area does not require a specific lighting uniformity. The single layout is also helpful in demonstrating the difference between beam types.

Figure 8E:
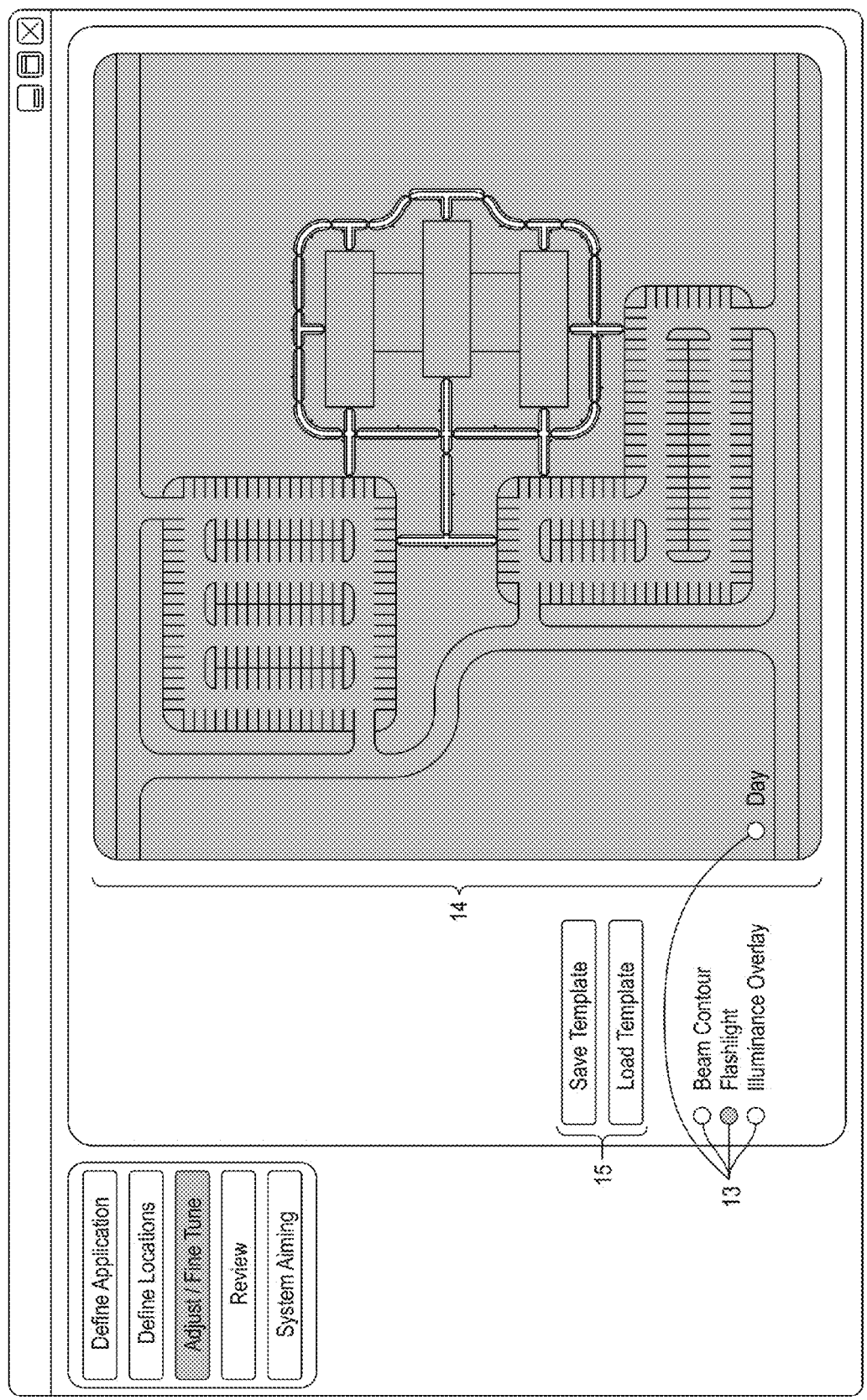
Figure 8F:
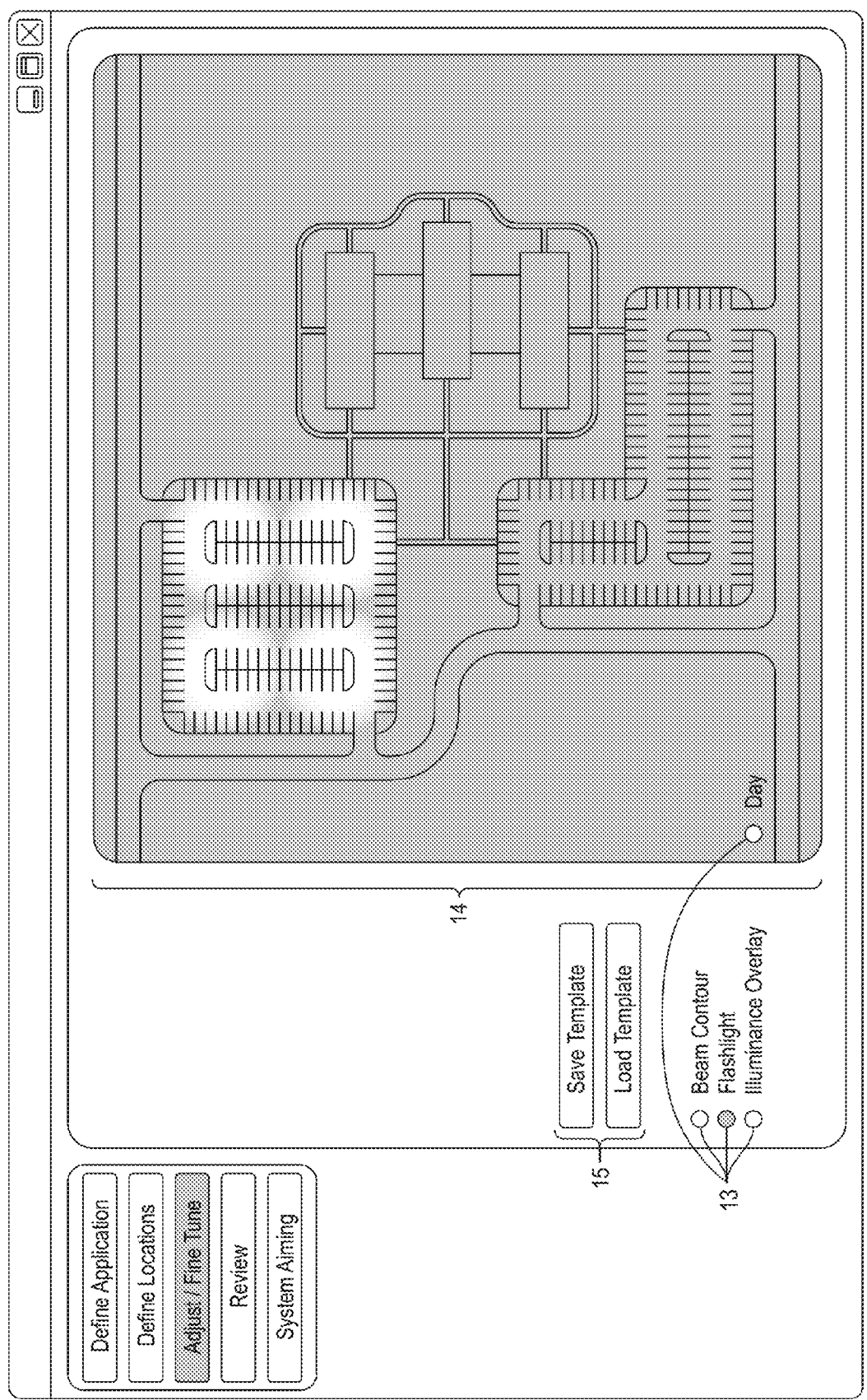
Figure 8G:
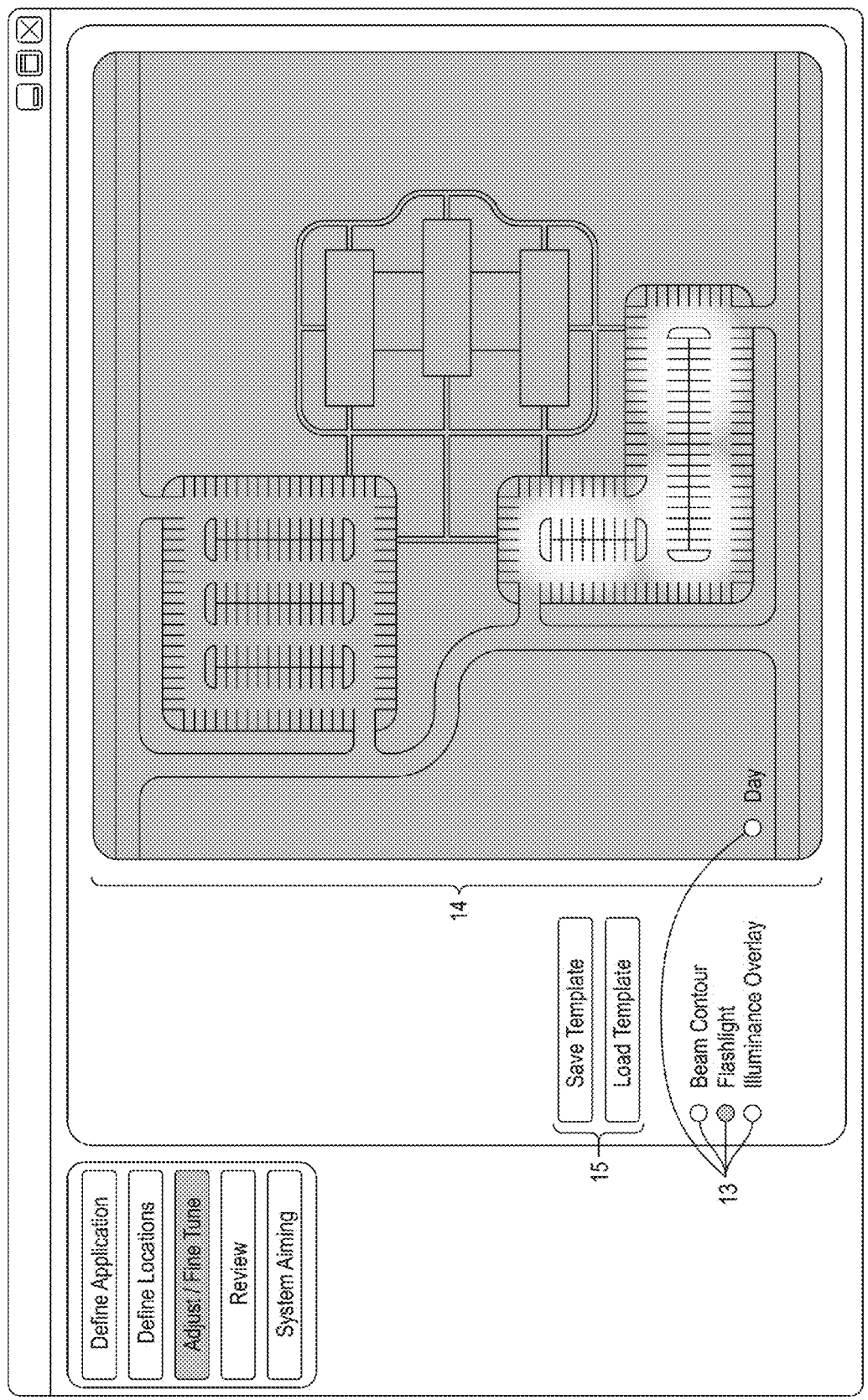

After defining virtual aiming locations, the user may generate virtual representations of light to project from the aiming locations by selecting the Adjust/Fine Tune tab; this is illustrated for FIGS. 8B-D in FIGS. 8E-G, respectively. Like in the previous embodiment, the user may view the virtual target area (reference no. 14) as it might appear at night (reference no. 13), and has the option of saving the collection of aimed light sources and aiming locations as a template (reference no. 15) for use with other virtual target areas/scenes. This tab is useful for correcting placement of virtual light sources; for example, if a virtual light source is placed in a parking stall or other location which is not feasible for placement of an actual luminaire. As envisioned, there is no symmetry function so each luminaire may be moved independently and further, since horizontal (i.e., floodlight-type) applications typically have a fixed aiming angle there is no option for changing the aiming of virtual luminaires, though this is by way of example and not by way of limitation.

In a manner like that described for the vertical lighting application, the rendered image and original image may be compared via the Review tab—including, if desired, cost and usage information. Also similar to that described for the vertical lighting application, information useful to a lighting designer in developing an actual lighting system is available via the System Aiming tab.

E. Options and Alternatives

The invention may take many forms and embodiments. The foregoing examples are but a few of those. To give some sense of some options and alternatives, a few examples are given below.

Exemplary embodiments described herein have set forth a particular look to the user interface; this is by way of example and not by way of limitation. The user interface is not limited to a computer program nor the exact layout illustrated herein. Further, the user interface is not limited to the options discussed herein. For example, the user interface could omit the selection of application type (reference no. 1) thereby making all customization features available regardless of what the user wants to illuminate. Alternatively, additional application types could be added to the user interface; this may be preferable, for example, to accommodate users of varying degrees of proficiency in lighting design.

With further regard to the layout of the user interface and features therein, one option may be to include a lighting scan (also referred to as a point-by-point or lighting summary) in the System Aiming tab which may be printed or otherwise exported. As is well known in the art, lighting scans are useful for confirming adherence to lighting requirements (e.g., uniformity, max/min values), which may be required before an actual lighting system can be purchased.

With regard to the virtual target area, as envisioned a user may create a model or upload an image of the actual target area; it is to be understood that some features or processes may or may not be valid or appropriate depending on how the virtual target is created. For example, the tone mapping is most applicable when photorealistic lighting overlays are layered on a color image of an actual target area; if the user creates a wireframe model and selects isocandela diagrams, a modified form of method 2000 may apply.

With further regard to the virtual target area, it is assumed that if an image is uploaded it is of high quality and taken during the day, though this may not be the case. For example, if a photograph is taken during the night the user interface could include a function which permits the user to lighten the scene when the image is uploaded; this would have a similar effect to increasing ambient illuminance without affecting the tone map calculation. Alternatively, a user could simply use a commercially available graphics editing program (e.g., Adobe Photoshop®) to create a more suitable image for uploading into the user interface. This latter approach is also useful for diminishing shadows or other dark areas on the image to be uploaded, though a user could address this directly within the user interface by creating a virtual target area on the shadow or dark area and assign a much higher reflectance than in other virtual target areas (i.e., zones).

With regard to the generation of visual representations of light, it is to be understood that aspects of the present invention are not limited to the steps of method 2000. For example, while taking into account ambient illuminance is beneficial as it helps ensure the virtual target area matches the actual target area, in some situations it may not be possible to measure ambient illuminance (e.g., at undeveloped sites) and so this lighting layer may be omitted from the rendered image. As another example, the step of applying a light layer (2004) could comprise a sub-step in that any non-active photometric projection patterns may be cached and so provide another layer of lighting in the rendered image; this may be useful, for example, to preserve real-time operation when the user has added many virtual light sources but is only manipulating one at a time.

What is claimed is:

1. A method of producing a rendering representative of an actual target area illuminated by at least one actual light source comprising:
    a. generating with a computer on a display a virtual target area representative of the actual target area;
    b. selecting one or more virtual aiming locations relative to the virtual target area;
    c. selecting one or more virtual light sources for each of the one or more virtual aiming locations, the one or more virtual light sources having corresponding photometric data, the photometric data derived from one or more actual light sources;
    d. generating a graphical representation of the photometric data and projecting the graphical representation onto the virtual target area from the one or more virtual aiming locations;
    e. visually indicating portions of the virtual target area exceeding a defined illuminance;
    f. so that a rendering of illumination of the virtual target area by the virtual light sources is created for viewing and evaluation on the display.

2. The method of claim 1 wherein the one or more virtual aiming locations correspond to one or more actual aiming locations and wherein the determining one or more virtual aiming locations comprises evaluating the actual target area.

3. The method of claim 1 wherein the step of generating the virtual target area comprises defining one or more characteristics of the actual target area.

4. The method of claim 3 wherein the one or more characteristics of the actual target area comprises:
    a. physical dimensions;
    b. reflectance;
    c. ambient illuminance; and
    e. target lighting uniformity.

5. The method of claim 1 wherein the graphical representation of the photometric data comprises (i) one or more contour curves or (ii) a photorealistic lighting overlay.

6. A method for designing a lighting system for a target without actually lighting the target comprising:
    a. generating an image representative of the target on a display or monitor comprising:
        i. creating a base image of the target; and
        ii. modifying the base image to account for a desired or selected simulated ambient illuminance of the target;
    b. generating in a computer one or more adjustable virtual photometric patterns based on selectable lighting parameters;
    c. projecting the one or more virtual photometric patterns onto the image on the display, wherein the projecting comprises:
        i. evaluating the generated image in terms of RGBE components;
        ii. modifying the RGBE components based on the one or more virtual photometric patterns; and
        iii. applying a tone map modifier to the image on the display;
    d. evaluating the virtual photometric patterns projected onto the image on the display; and
    e. designing an actual lighting system based on a set of said selectable lighting parameters wherein the set of selected lighting parameters is based, at least in part, on the evaluation of step d.

7. The method of claim 6 further comprising providing an estimate of the cost of operating a lighting system based on (i) the set of selected lighting parameters and (ii) an estimated usage.

8. The method of claim 6 wherein the lighting parameters comprise one or more selectable features of a light source comprising:
    a. type;
    b. size;
    c. luminous intensity;
    d. color properties; and
    e. nature of beam pattern projected therefrom.

9. The method of claim 6 carried out as a function of a portable computing device, the portable computing device having at least a processor, a monitor, a manually operated member, and digital storage.

10. The method of claim 9 wherein the step of projecting the one or more virtual photometric patterns onto the image is viewable on the monitor in real time.

11. The method of claim 10 wherein the one or more virtual photometric patterns may be adjusted relative to the image via the manually operated member.

12. A system for producing a realistic rendering of an illuminated outdoor target area at night comprising:
    a. means for producing a virtual representation of an actual target area including:

i. means for defining the physical dimensions of the actual target area;
 ii. means for defining one or more lighting requirements of the actual target area;
 iii. means for defining ambient light levels at the actual target area during a nighttime condition; and
 iv. means for converting the physical dimensions, one or more lighting requirements, and ambient light levels of the actual target area into a virtual representation of the actual target area at night;
b. means for producing a virtual representation of illumination including:
 i. means for selecting a virtual light source, the light source having associated photometric data; and
 ii. means for converting photometric data into a virtual representation of illumination based on the selected light source and associated photometric data;
c. means for projecting the virtual representation of illumination onto the virtual representation of the actual target area including:
 i. means for defining one or more aiming points on the virtual representation of the actual target area;
 ii. means for indicating whether the lighting requirements of the actual target area have been met; and
 iii. means for merging, combining, or integrating the virtual representation of illumination with the virtual representation of the actual target area so to create the rendering;
d. means for modifying the rendering so to produce a realistic rendering wherein the step of modification comprises tone mapping at least a portion of the rendering.

13. The system of claim 12 wherein the means for producing a virtual representation of an actual target area further comprises means for converting the physical dimensions, one or more lighting requirements, and ambient light levels of the actual target area into a virtual representation of the actual target area at day.

* * * * *